United States Patent [19]
Suzuki et al.

[11] Patent Number: 5,123,012
[45] Date of Patent: Jun. 16, 1992

[54] TIME DIVISION SWITCHING APPARATUS

[75] Inventors: Takamasa Suzuki; Takeshi Shimpuku; Takane Kakuno, all of Kanagawa, Japan

[73] Assignee: Mitsubishi Denki Kabushiki Kaisha, Tokyo, Japan

[21] Appl. No.: 532,711

[22] Filed: Jun. 4, 1990

[30] Foreign Application Priority Data

| Jun. 6, 1989 | [JP] | Japan | 1-143291 |
| Jul. 12, 1989 | [JP] | Japan | 1-318132 |
| Aug. 25, 1989 | [JP] | Japan | 1-219839 |

[51] Int. Cl.$^5$ ............................................. H04J 3/02
[52] U.S. Cl. .................................... 370/66; 370/68
[58] Field of Search ............................ 370/66, 67, 68

[56] References Cited

U.S. PATENT DOCUMENTS

| 4,574,375 | 3/1986 | Kemp et al. | 370/67 |
| 4,941,141 | 7/1990 | Hayano | 370/66 |

Primary Examiner—Benedict V. Safourek
Assistant Examiner—Melvin Marcelo
Attorney, Agent, or Firm—Rothwell, Figg, Ernst & Kurz

[57] ABSTRACT

A time division switching apparatus for interchanging data between an input highway and an output highway includes a number of buffer memories each receiving the same data from the input highway in parallel, a control memory for controlling the addresses of the buffer memories into which the data is written, and for controlling the addresses of the buffer memories from which data is written, at specific time positions. The apparatus may include demultiplexing/multiplexing circuitry for converting serial data to parallel data for storing in the buffer memories and parallel data from the buffer memories to serial data to be sent to the output highway. Data be interchanged according to specific data bit units or time slot units, wherein each time slot defines a specific number of data bits.

25 Claims, 18 Drawing Sheets

FIG. 20(A)

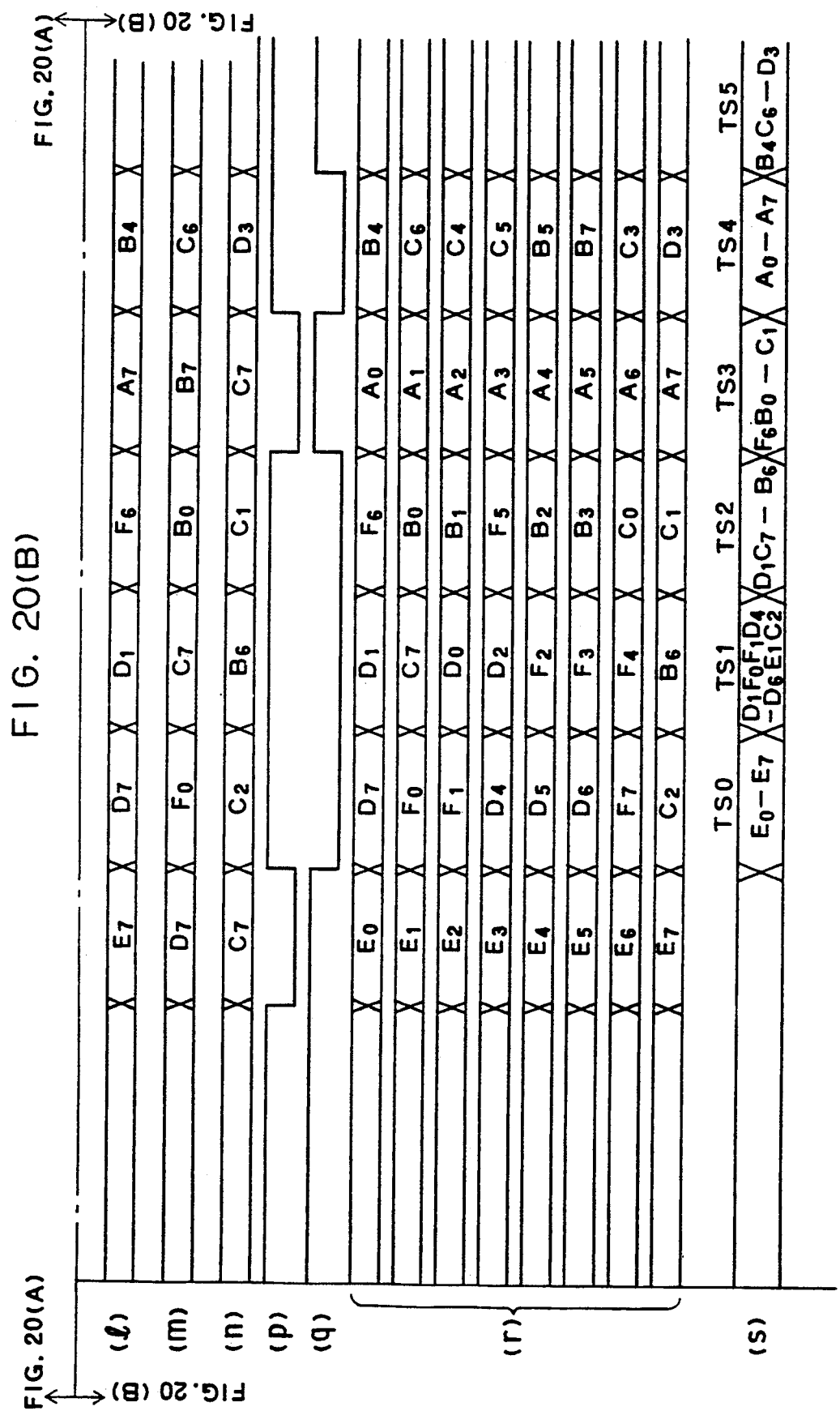

TIME DIVISION SWITCHING APPARATUS

BACKGROUND OF THE INVENTION

1. Field of the Invention

The present invention relates to a time division switching apparatus, and particularly to an improvement in a time division switching apparatus which collectively performs, for example, the interchange of a bit unit and that of a time slot unit, and especially carries out the interchange of digital data.

2. Description of the Prior Art

FIG. 1 shows the construction of a time division switching apparatus which performs a digital data exchange illustrated, for example, in FIG. 1.33 on page 43 of the technical magazine entitled "Simple Digital Data Exchange (Yasashii Digital Koukan)" published by Ohm Co., Ltd. In the same drawing, there are shown a time division switching apparatus 100, a counter 114, a control memory 115, a buffer memory 111, an input highway 150, an output highway 160, a reference pulse 170, a clock 180, a value 190 to be counted, which is used as an address to be inputted to each of the buffer memory 111 and the control memory 115, and an output 200 from the control memory 115, i.e., a control memory output.

FIG. 2 is a timing chart for describing the operation for writing data received from the input highway 150, i.e., on the input highway 150 into the buffer memory 111 provided in the time division switching apparatus 100 shown in FIG. 1. FIG. 3 is a timing chart for describing the operation for reading data from the buffer memory 111 to the output highway 160.

Referring to FIGS. 2 and 3, symbols $t_1$, $t_2$, ... indicate time positions. A description will next be made on the operation of this apparatus. In FIG. 1, the counter 114 is reset by the reference pulse 170 which is periodically repeated. The counter 114 also serves to produce the counted value 190 in step-by-step operation based on the clock 180 until it is reset by the following reference pulse 170 so as to supply the same to the buffer memory 111 and the control memory 115. Then, the buffer memory 111 serves to write data on the input highway 150 into an address designated by the counted value 190, and the control memory 115 supplies the data, which have been written into the address designated by the counted value 190, as a control memory output 200, to the buffer memory 111. Further, the buffer memory 111 serves to read out data from an address designated by the control memory output 200 so as to supply the read data to the output highway 160.

A description will now be made on the operation timing referred to above. Referring to FIG. 2, data of A, B, C, D and E on the input highway 150 are written into a buffer memory in which #0, #1, #2, ... constituting the counted value 190 as output values from the counter 114 are taken as addresses. Referring to FIG. 3, the counted value 190 from the counter 114 corresponds to #0 at the time position $t_1$. Then, the control memory 115 produces the count value #1, which has been written into an address #0, thereof, as the output 200. The buffer memory 111 produces data, which have been written into address #1, in response to the control memory output 200 as an address. Since data B have been written into an address #1 in the buffer memory 111, as shown in FIG. 2, the data B are outputted at the time position $t_1$ in FIG. 3 where the reference pulse 170 shown in FIG. 3 is a pulse at a position delayed from the reference pulse 170 shown in FIG. 3 by one cycle. Similarly, the buffer memory 111 outputs data A, which have been written into an address #0, thereof, at the time position $t_2$. Similarly, any one of data is also outputted at the time positions $t_3$, $t_4$ and $t_5$ by performing the same operation as referred to above.

FIG. 4 is a diagram illustrative of the connection of transmission devices 1081, 1082 to an input highway 150 and an output highway 160 respectively. A description will now be made to the data exchange with reference to FIG. 4.

In FIG. 4, for example, the transmission device 1081 serves to output data A to the input highway 150 at the time position $t_1$ shown in FIGS. 2 and 3, and receive data from the output highway 160 at the same time position, while the transmission device 1082 serves to output data B to the input highway 150 at the time position $t_2$, and receive data from the output highway 160 at the same time position. When the time division switching apparatus 100 operates to execute the exchange of data at such time positions as shown in FIGS. 2 and 3, the transmission device 1081 serves to receive the data B outputted from the transmission device 1082 whereas the transmission device 1082 serves to receive the data A outputted from the transmission device 1081. Thus, the exchange between the data A and B is made, so that the data exchange is performed between the transmission devices 1081 and 1082.

Since the conventional time division switching apparatus is constructed as described above, necessary measures such as an increase in the operation frequency of the time division switching apparatus should be taken depending on an increase in the quantity of data to be exchanged within a given period of time or reduction in the capacity of data units such as a frame unit, an octet unit, a bit unit, etc. In addition, since the buffer memory and the control memory provided in the time division switching apparatus each make use of memory circuits, the limit of the operation frequency of each memory circuit is lower than that of the operation frequency of another circuit. Thus, a restriction is imposed on the quantity of data to be exchanged and the data units owing to the limit of the operation frequency of each of the buffer memory and the control memory.

Further, when a plurality of input highways and output highways are employed in the apparatus, such a circuit construction as shown in FIG. 5 is usually taken.

In other words, a multiplexer 1091 serves to convert data on each of input highways 150a, 150b, ..., 150n into data represented in a multiplex form so as to apply the resultant data to a high-speed highway 1501. Then, the time division switching apparatus 100 serves to convert the data on the high-speed highway 1501 on a time-sharing basis into a desired data so as to apply the result to a high-speed highway 1601. A demultiplexer 1092 serves to separate data on the high-speed highway 1601 into individual data so as to supply the same to corresponding output highways 160a, 160b, ... 160n. At this time, the data transfer frequency of each of the input highways 150a, 150b, ..., 150n is equal to that of each of the output highways 160a, 160b, ..., 160n. The data transfer frequency of each of both the high-speed input highway 1501 and the high-speed output highway 1601 is equal to the sum of the input highways 150a, 150b, ..., 150n or the output highways 160a, 160b, ..., 160n.

Accordingly, the time division switching apparatus 100 must be activated at the frequency equal to the total data transfer frequency of the input highways 150a, 150b, ..., 150n or the output highways 160a, 160b, ..., 160n. Besides, an upper limit is taken for the operation frequency of each of circuits such as a memory circuit, etc. employed in the time division switching apparatus 100, so that limitations are imposed on the number of highways which are containable.

FIG. 6 is a timing chart showing an example in which read/write for the buffer memory 111 is performed in the former half or later half of a time slot, in the case when both data on input highway 150 and on output highway 160 in FIG. 1 are an 8-bit parallel data, and shows an example in which data on the input/output highways are multiplexed in the form of 32 words by 8 bits per word, where F represents a frame, TS a time slot, R a read period and W a write period. The counter 114 will produce addresses of 0−31 in the buffer memory 111 within a time interval corresponding to one frame F. At this case, the buffer memory 111 is set in the form of 32 words by 8 bits whereas the control memory 115 is constructed in the form of at least 32 words by 5 bits.

Information of 000-007 represented in the form of 8 bits on the input highway is applied as one word to the buffer memory 111. Where the sequential write and random read system is employed during the read period R corresponding to the first half of one time slot TS, a selector serves to select a desired address out of addresses read from the control memory 115 and apply the same as a reading address for the buffer memory 111 thereto. Thereafter, 8-bit information read from the buffer memory 111 is delivered to the output highway. During the write period W corresponding to the latter half of said one time slot TS, the selector serves to select a desired output out of outputs from the counter 114 and then apply the same as a writing address for the buffer memory 111 thereto. Then, the 8-bit information of 000-007 on the input highway is written into, for example, a location 0.

During the period of the following time slot, an address read from the control memory 115 during the read period R is read from the buffer memory 111 as a reading address. 8-bit information of 010-017 on the input highway is written into, for example, a location 1 in the buffer memory 111, taking an output from the counter 114 as a writing address.

The principle of the interchange of data is same as the principle thereof in FIG. 1, FIG. 2 and FIG. 3.

Where the switching of data between one bit units is performed using the above-described conventional time division switching apparatus, each memory is constructed in the form of 256 words by one bit. Since the control memory 115 is constructed in the form of 256 words by 8 bits, it is necessary to perform the high-speed operation of eight times the access speed as compared with the case where 8-bit parallel access (access of the time slot unit) is executed. In the time division switching apparatus in which the switching of one bit units has been constructed as a criterion, where it is desired to perform the interchange of the time slot unit, it is necessary to set or incorporate address information corresponding to 8 bits into the control memory 115, thereby causing a problem that a lot of time is required to establish each of switches for performing the interchange of the time slot unit.

SUMMARY OF THE INVENTION

The present invention has been completed to solve the above-described problems in the prior art.

A first object of the present invention is to provide a time division switching apparatus which permits the exchange of data in quantities larger than those in a conventional example and at a data interchange unit smaller than that employed in the conventional example, without having any restriction on the quantity of data to be interchanged by the limits of the operation frequencies of a buffer memory and a control memory.

A second object of the present invention is to provide a time division switching apparatus which is capable of increasing the amount of data highways without being subjected to any restriction caused by the limits of the operation frequency of each of circuits such as a memory circuit, etc.

A third object of the present invention is to provide a time division switching apparatus which permits the exchange of data in quantities larger than those in the conventional example, even at the same operation speed as that in the conventional example or at the operation speed less than that in the conventional example.

A fourth object of the present invention is to provide a time division switching apparatus which is capable of realizing the interchange of a bit unit representative of a minimal unit for the data interchange, at the operation speed lower than that employed in the conventional example.

A fifth object of the present invention is to provide a time division switching apparatus which permits both the interchange of a time slot unit and the interchange of a bit unit without setting the operation speed of each of a buffer memory and a control memory to high speed, and can also decrease address information to be incorporated into the control memory upon interchange of the time slot unit.

In order to achieve the first, third and fourth objects described above, there is provided a time division switching apparatus according to the present invention, which comprises a demultiplexing circuit for converting data received serially into parallel data composed of a plurality of bits; a plurality of buffer memories each for simultaneously writing the parallel data therein; an address generator for generating data writing addresses for the buffer memories therefrom; a plurality of control memories each for producing a data reading address from the buffer memory and a select code therefrom based on control information; a plurality selectors each for selecting a desired data out of respective parallel data read from the individual buffer memories in accordance with the reading address, according to the select code based on the control information; and a multiplexing circuit for producing the selected individual bit data in a multiplex form. In other words, the demultiplexing circuit serves to convert received data into parallel data represented in the form of a plurality of bits so as to apply in parallel the converted data to each of time division switches including a plurality of buffer memories. Thus, a plurality of buffer memories serve to simultaneously write parallel data therein respectively based on received addresses designated by the address generator. When the control memories apply output addresses and select codes to the buffer memories and selectors respectively based on the received addresses designated by the address generator, each of the buffer memories reads out parallel data based on the output addresses, and each of the selectors serves to select any one of parallel bit data read from each of the buffer memories in accordance with each of the select codes and apply the selected each one to the multiplexing circuit successively, where each bit data is converted on the time-sharing basis in a multiplex form by the multiplexing circuit so as to be delivered to an output highway.

In order to achieve the above-described second object, there is provided a time division switching apparatus according to the present invention, comprising a plurality of time division switches for writing data received from a plurality of input highways therein in parallel and for selecting a desired data from the data written so as to supply the same to the corresponding one of output highways, said plurality of time division switches each including a buffer memory for storing data received from the plurality of input highways therein in parallel successively; a control memory for storing a reading address for the buffer memory and selection information therein based on control information; an address generator for generating a data writing address with respect to the buffer memory and for generating an address for the address reading with respect to the control memory; and a selector for selecting a predetermined data out of a plurality of data read from the buffer memory so as to supply the same to the corresponding one of the output highways based on the selection information.

In other words, the buffer memory serves to write the data received from the plurality input highways therein simultaneously in parallel in accordance with the writing address outputted from the address generator. On the other hand, the control memory serves to supply the reading address for the buffer memory to the buffer memory in accordance with the writing address and to read out parallel data from the buffer memory based on the reading address so as to apply the same to the selector. In addition, the selector serves to select the desired data out of the parallel data read from the buffer memory in accordance with the content in the control memory so as to supply the same to the corresponding one of the output highways.

In order to achieve the above-described fifth object, there is provided a time division switching apparatus which performs the interchange of a bit unit and a time slot unit with respect to multiplexed signals received from input highways, the improvement comprising a demultiplexing circuit for parallelly converting each of a plurality of bit signals which are to be inputted in the form of multiplexed signals; a plurality of buffer memories for storing each of the parallelly converted signals therein; an address counter for producing a data writing address with respect to each of the buffer memories; a plurality of control memories each for storing a memory-content reading address for each buffer memory and interchange-unit identifying information therein based on control information; a plurality of registers each for temporarily storing the parallelly converted signals read from each of the buffer memories therein, said each register corresponding to each of the memories; and a plurality of signal selectors each for selecting a parallel signal used for the interchange of the time slot unit from each register or selecting a predetermined bit signal used for the interchange of the bit unit from parallel signals in each register in accordance with the interchange-unit identifying information outputted, together with the address, from each of the control memories and for supplying the same to a multiplexing circuit.

Consequently, if the interchange-unit identifying information outputted from the buffer memory means the interchange of the time slot unit, a signal corresponding to a time slot length is selected from the corresponding buffer memory so as to be delivered to the output highway through a multiplexing circuit, or means the interchange of the bit unit, bit by bit in a predetermined form is selected from a plural of signals read out of the corresponding buffer memory so as to be delivered to the multiplexing circuit.

It is thus possible to realize a time-division channel switch on the bit unit basis even in the case where the buffer memory and the control memory are made up of memories each having the operation speed slower than the signal speed on each of the highways. It is also unnecessary to set or incorporate address information corresponding to a time slot length in each of the control memories even upon interchange of the time slot unit.

The above and other objects, novel features and advantages of the present invention will become more apparent from the following detailed description and the appended claims, taken in conjunction with the accompanying drawings in which preferred embodiments of the present invention are shown by way of illustrated example. However, the accompanying drawings are merely intended for illustration, and hence no limitation is imposed on the scope of the present invention.

BRIEF DESCRIPTION OF THE DRAWINGS

FIGS. 20A and B show a diagram for describing the operation of the third embodiment of FIG. 18.

DETAILED DESCRIPTION OF THE PREFERRED EMBODIMENTS

Preferred embodiment of the present invention will hereinafter be described in detail with reference to the accompanying drawings.

Figure 7:
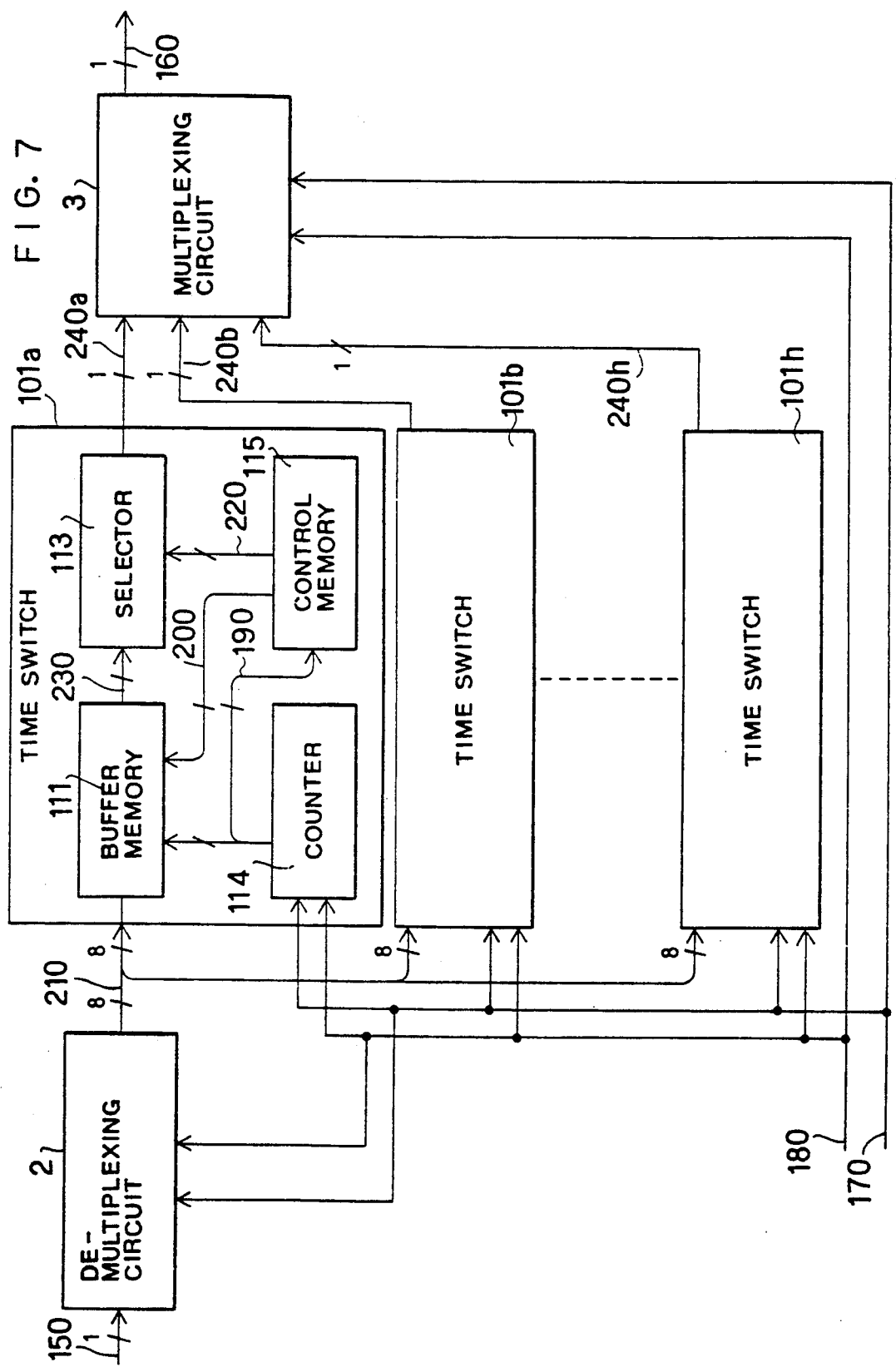
FIG. 7 is a block diagram showing the construction of a time division switching apparatus according to a first embodiment of this invention.

FIG. 7 shows a first embodiment for realizing a time division switching apparatus of the present invention. In the same drawing, designated at numeral 101 corresponding to, for example, each of 101a, 101b, ..., 101h is a time switch, and numeral 2 indicates a demultiplexing circuit. Designated at numeral 3 is a multiplexing circuit.

The time switch 101 is constructed of a buffer memory (speech memory) 111, a control memory 115, a selector 113 and a counter 114. In addition, numeral 170 indicates a reference pulse and numeral 180 indicates a clock. Both are applied to each of the time switches 101a, 101b ..., 101h and the multiplexing circuit 3. The reference pulse 170 is used to determine a time position for each circuit whereas the clock 180 is employed as a drive clock for each circuit.

Figure 8:
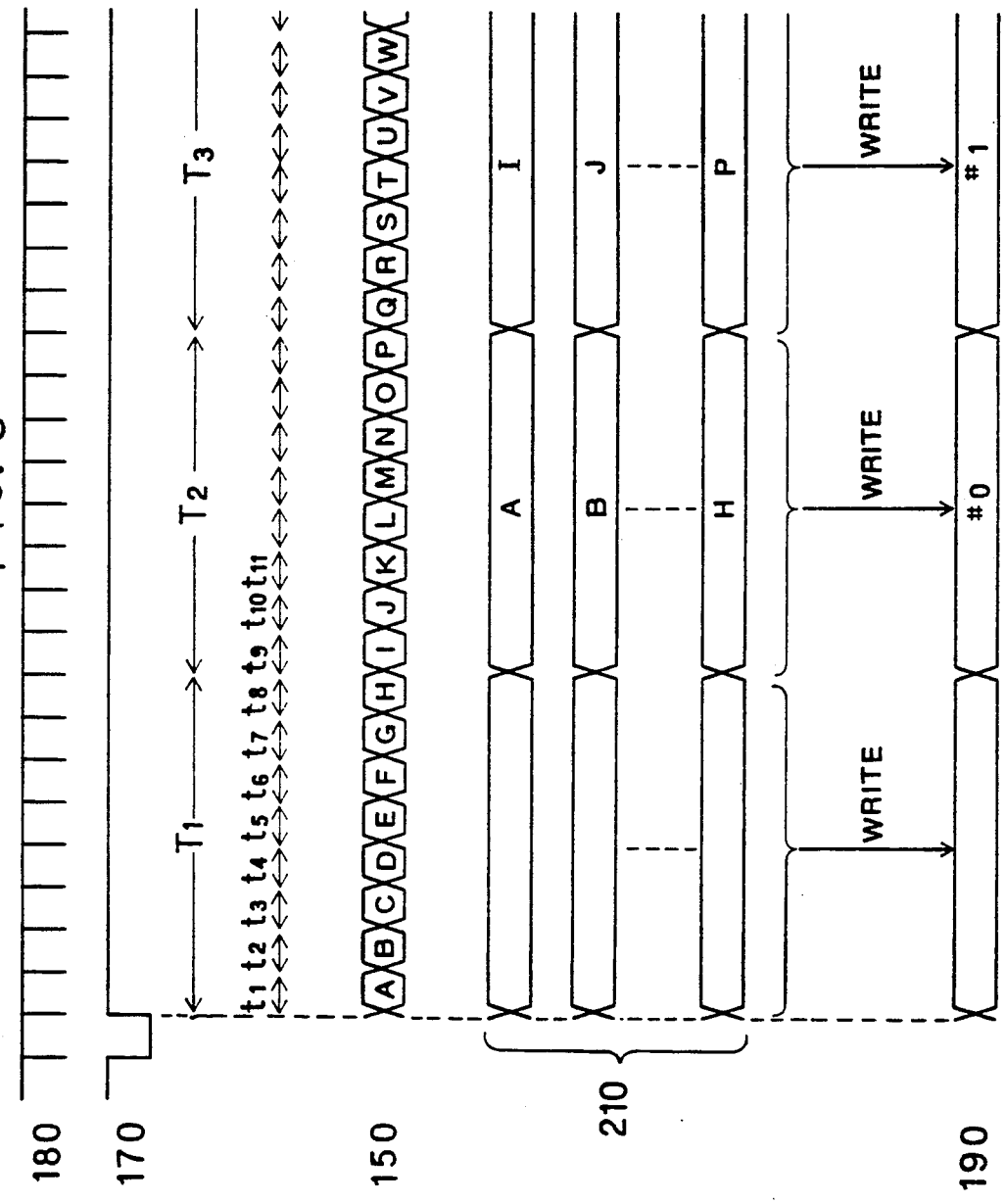
FIGS. 8 and 9 are timing charts for describing the operation of the first embodiment shown in FIG. 7.
Figure 9:
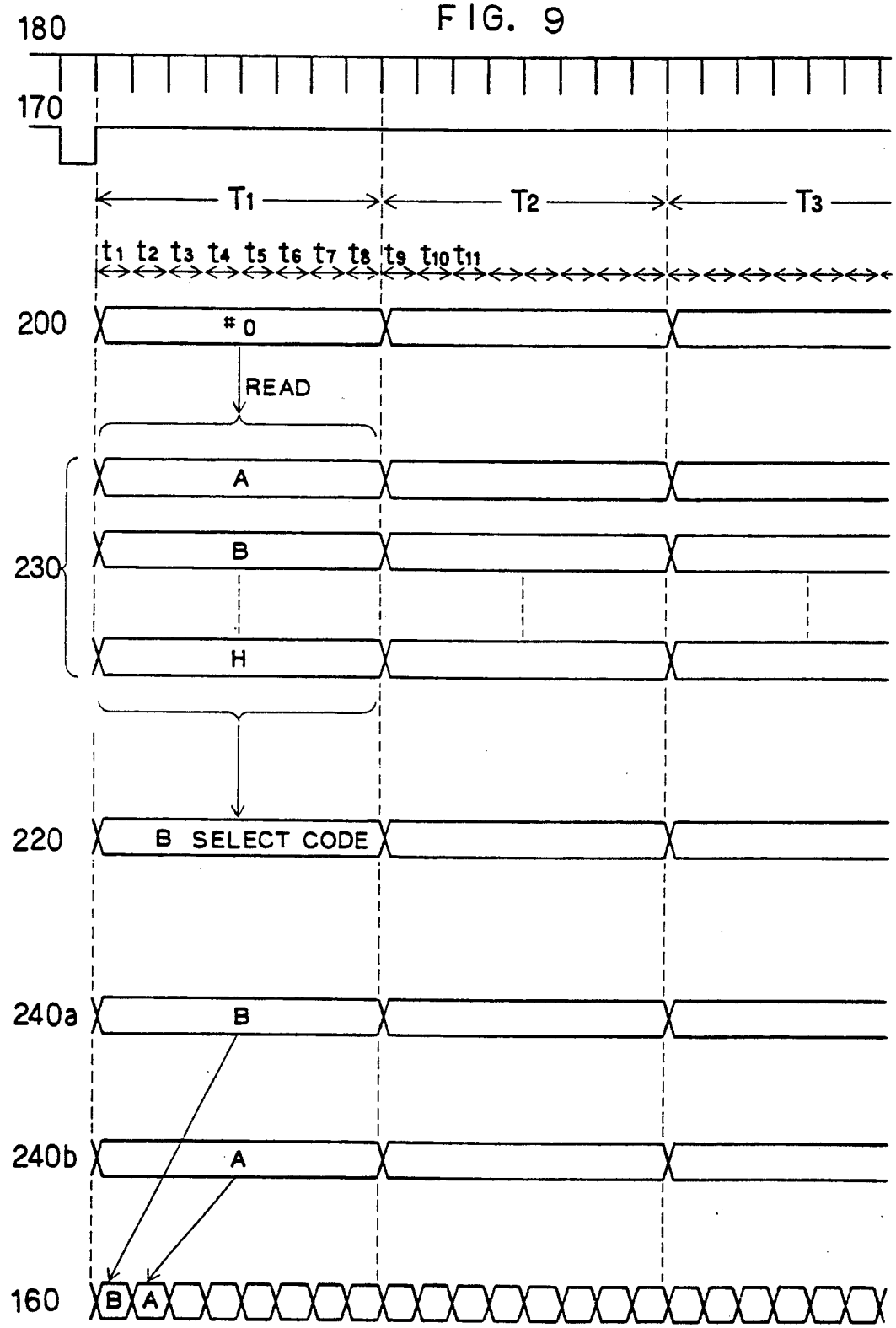

In the first embodiment shown in FIG. 7, data inputted from an input highway 150, i.e., the input data on the input highway 150 correspond to serial data and are then converted into 8-bit parallel data by the demultiplexing circuit 2. The number of time switches 101 will hereinafter be described as eight switches. However, the number of bits and the time switches 101 to be arranged in parallel can be selected arbitrarily. FIG. 8 is a diagram for describing the operation timing for writing data in the buffer memory 111 shown in FIG. 7 whereas FIG. 9 is a diagram for describing the operation timing for reading data from the buffer memory 111. Symbols $t_1, t_2, \ldots$ represent time positions each corresponding to a bit unit and symbols $T_1$ and $T_2$ indicate time positions each corresponding to an 8-bit unit. In the drawings, the left-side numerals correspond to input/output signals of respective circuits shown in FIG. 7.

A description will hereinafter be made on the operation of the present embodiment with reference to FIGS. 7, 8 and 9. Referring now to FIGS. 7 and 8, the serial input data on the input highway 150 are converted into data in the form of 8-bit parallel data by the demultiplexing circuit 2 and the converted data are applied to each of the time switches 101a, 101b, ..., 101h. Then, 8-bit parallel data are written into addresses in the buffer memory 111, which are specified by input addresses 190 outputted from the counter 114 in the time switch 101a. Control information for selecting parallel data from the control memory 115 and reading out the same therefrom has been stored therein. The control information includes a reading/writing address of the buffer memory 111 for reading/writing the parallel data from/to the buffer memory 111; and a select code to be sent to the selector 113 for selecting the predetermined unit of data out of the parallel data. Where it is desired to read out data from the buffer memory 111, the data are read from the buffer memory 111 in response to each output address 200 which is outputted, based on the control information, from each control memory 115 in each of the time switches 101a, 101b, ..., 101h, and the read data are supplied to the selector 113 as time-position conversion data 230. In the present embodiment, data of A, B, ..., H are outputted as the time-position conversion data 230 during the time interval of a time position $T_1$. The detailed process for performing the conversion of the time position is the same as that employed in the conventional example and its description will therefore be omitted herein. In the time switch 101a, the selector 113 serves to select data with specified bits out of the data of A, B, ..., H during the period of the time position $T_1$ at the time-position conversion data 230 in accordance with a select code 220 outputted from the control memory 115 based on the control information, and the selected data are then applied as select data 240a to the multiplexing circuit 3. In the present embodiment, 1-bit data are selected from 8-bit data and hence the select code 220 becomes is a parallel signal representative of a 3-bit form in terms of $8 = 2^3$. In the time switch 101a employed in the present embodiment, it is practiced to select data B during the time interval corresponding to the time position $T_1$. The time switch 101b also operates in a manner similar to the time switch 101a. In the time switch 101b employed in the present embodiment, it is practiced to produce data A as select data 240a at the time of the time position $T_1$. The time switches 101c, 101d, ..., 101h operate in a manner similar to the time switches 101a and 101b and their description will therefore be omitted. Even in the case of the time position subsequent to the time position $T_2$, the time switches 101a, 101b, ..., 101h operate in the same manner as described above. Then, the multiplexing circuit 3 serves to successively convert select data 240a, 240b, ..., 240h each of which is outputted from each time switch, into data represented in a multiplexed form, and, the multiplexed data are then transmitted over an output highway 160 as output data. In FIGS. 8 and 9, the data A inputted from the input highway 150 at the time position $t_1$ is outputted over the output highway 160 at the time position $t_2$ in a manner similar to the conventional example, whereas the data B inputted, at the time position $t_2$, from the input highway 150 is outputted, at the time position $t_1$, over the output highway 160. According to the present method, desired data can be produced at a desired time position over the output highway.

A description will next be made on write and read operation frequencies of the buffer memory 111 and a read frequency of the control memory 115 in each time switch according to the present invention. In the write operation frequency of the conventional type buffer memory 111, the write operation of data into the buffer memory 111 must be performed once within a time interval corresponding to one bit where the interchange of the bit unit has been carried out. Thus, if the data transfer rate on the input highway 150 and the output highway 160 is taken as Vbit/s, the operation frequency for writing data into the buffer memory 111 becomes V Hz. On the other hand, in the present embodiment, data on the input highway 150 are converted into 8-bit parallel data to write the same into the buffer memory 111. It is thus only necessary to write the data into the buffer memory 111 once within a time interval corresponding to 8 data bits on the input highway 150. Therefore, the operation frequency for writing the data into the buffer memory 111 becomes V/8 Hz. In other words, the operation frequency for writing data into the buffer memory 111 employed in the time division switching apparatus according to the present invention becomes V/N Hz provided that the number of parallel bits is taken as N. It is also possible to increase the number N of the parallel bits as needed by arranging the buffer memory 111 in parallel. Thus, even in the case where the quantity of data to be interchanged becomes greater and the data transfer rate V on the input highway 150 is increased, the write operation frequency of data into the buffer memory 111 can be controlled within the operation limit by increasing the number N of the parallel bits. Next, in the read operation frequencies of the buffer memory and the control memory, the read operation of data from the buffer memory 111 and the control memory 115 must be performed once within a time interval corresponding to one data bit in the case where the interchange of the bit unit is carried out, in the conventional example. Thus, the operation frequencies for reading data from the buffer memory 111 and the control memory 115 each become V Hz. However, since eight time switches 101 are electrically connected in parallel, the operation frequencies for reading the data from the buffer memory 111 and the control memory 115 each become V/8 Hz. Namely, the operation frequencies for reading the data from the buffer memory 111 and the control memory 115 employed in the time division switching apparatus of the present invention each become V/M Hz if the number of the buffer memories 111 is taken as M. Accordingly, even in the case where the quantity of data to be interchanged becomes greater and the data transfer rate on the input highway 150 is increased, the operation frequencies for reading the data from the buffer memory 111 and the control memory 115 can be controlled within the limit of the read operation frequency by increasing the number of the buffer memories 111 as needed.

According to the present method, as described above, the buffer memory 111 and the control memory 115 both can be operated within the limit of the operation frequency even in the case where the data transfer rate becomes greater.

Figure 10:
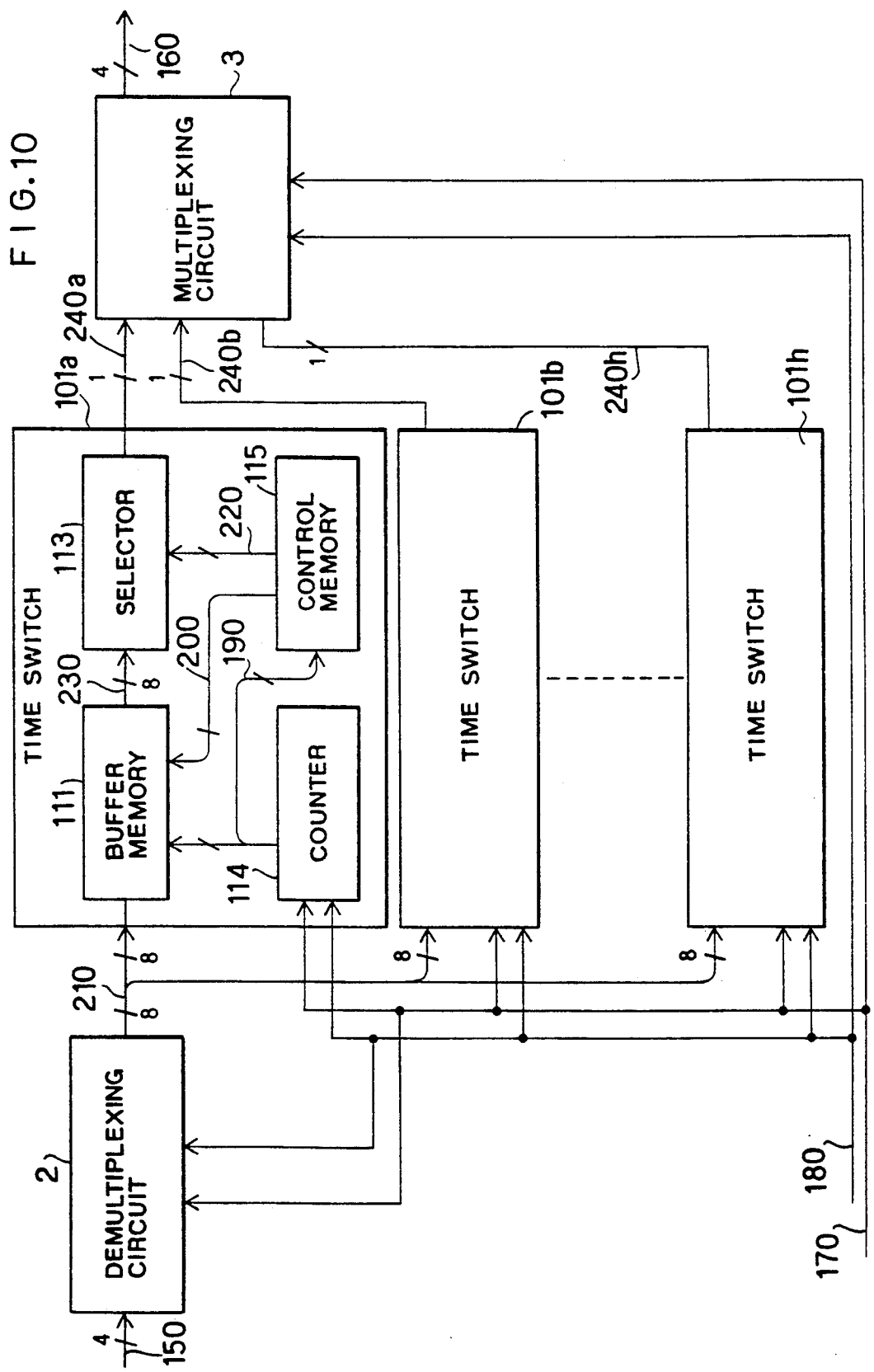
FIGS. 10, 11, 12, 13 and 14 are block diagrams, each of which is depicting the construction of each modification of the first embodiment.
Figure 11:
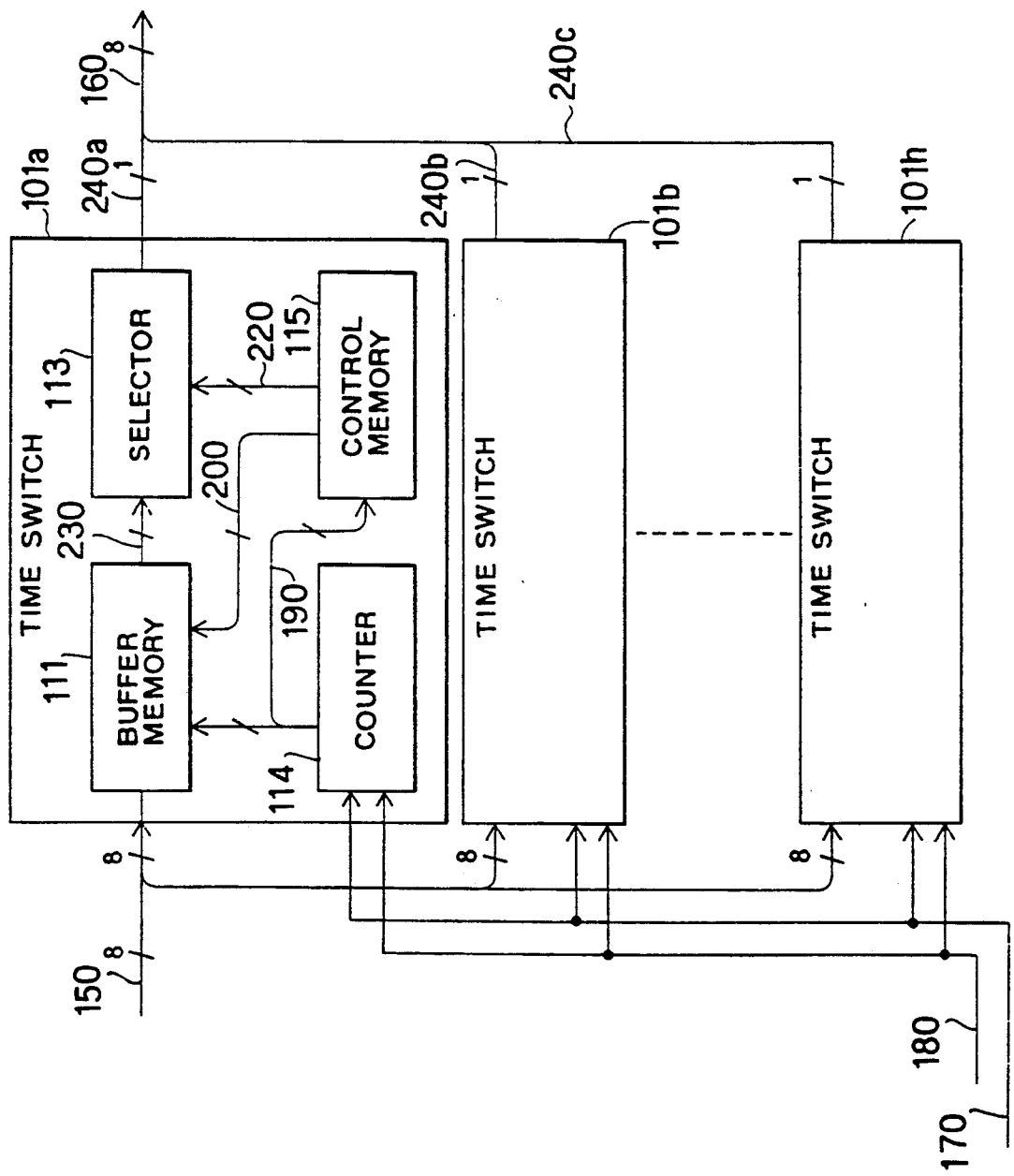

Although the data on the input highway 150 and the data on the output highway 160 both have been described as serial data in the above-described embodiment, they may be parallel data. In this case, it is only necessary to perform the conversion between the number of parallel bits of input data and the number of parallel bits to be written into the buffer memory 111 by means of the demultiplexing circuit 2 and to convert select data 240 outputted from each time switch 101 into parallel bit data represented in a multiplex form, to be conveyed on the output highway 160, by means of the multiplexing circuit 3. FIG. 10 shows one embodiment in which the data on the input highway 150 and on the output highway 160 are used in the form of 4-bit parallel data. As a specific example may be mentioned the following. In other words, where the number of parallel bits representing data on the input highway 150 is equal to the number of parallel bits representative of data to be converted by the demultiplexing circuit 2, the demultiplexing circuit 2 becomes unnecessary. In addition, where the number of parallel bits representative of data on the output highway 160 is equal to the number of the time switches 101a, 101b, ..., 101h, each of the select data 240a, 240b, ..., 240h may be used as data on the output highway 160. As a consequence, the multiplexing circuit 3 also becomes unnecessary. This example is shown in FIG. 11. In FIG. 11, the input/output data are set as 8-bit parallel data.

Figure 12:
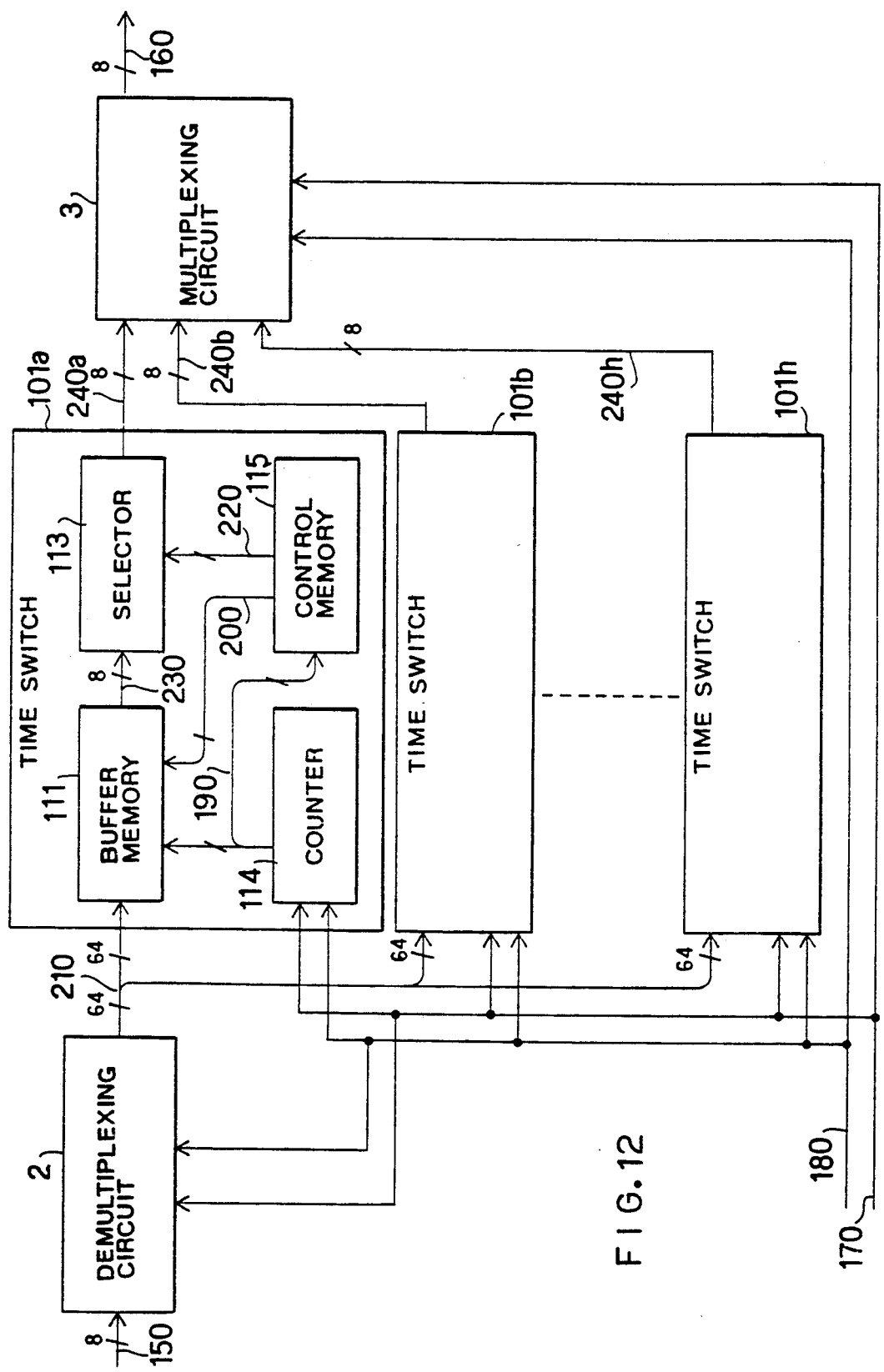

Although the interchange unit of data is established for each bit in the above-described embodiment, it is also feasible to establish the interchange unit of the data at an arbitrary bit unit as well as at a time slot unit. Where it is desired to establish the interchange unit of the data at an n-bit unit, the demultiplexing circuit 2 serves to convert the number of parallel bits into parallel data having the number of bits greater than that of n bits, and the selector 113 serves to produce select data at an n-bit unit, followed by multiplexing of the same by the multiplexing circuit 3. FIG. 12 shows an example wherein data inputted in a 8-bit parallel form are interchanged at a 8-bit unit. In this case, the demultiplexing circuit 2 converts 8-bit parallel input data into 64-bit parallel data and the selector 113 serves to select data taking 8 bits as a unit.

Figure 13:
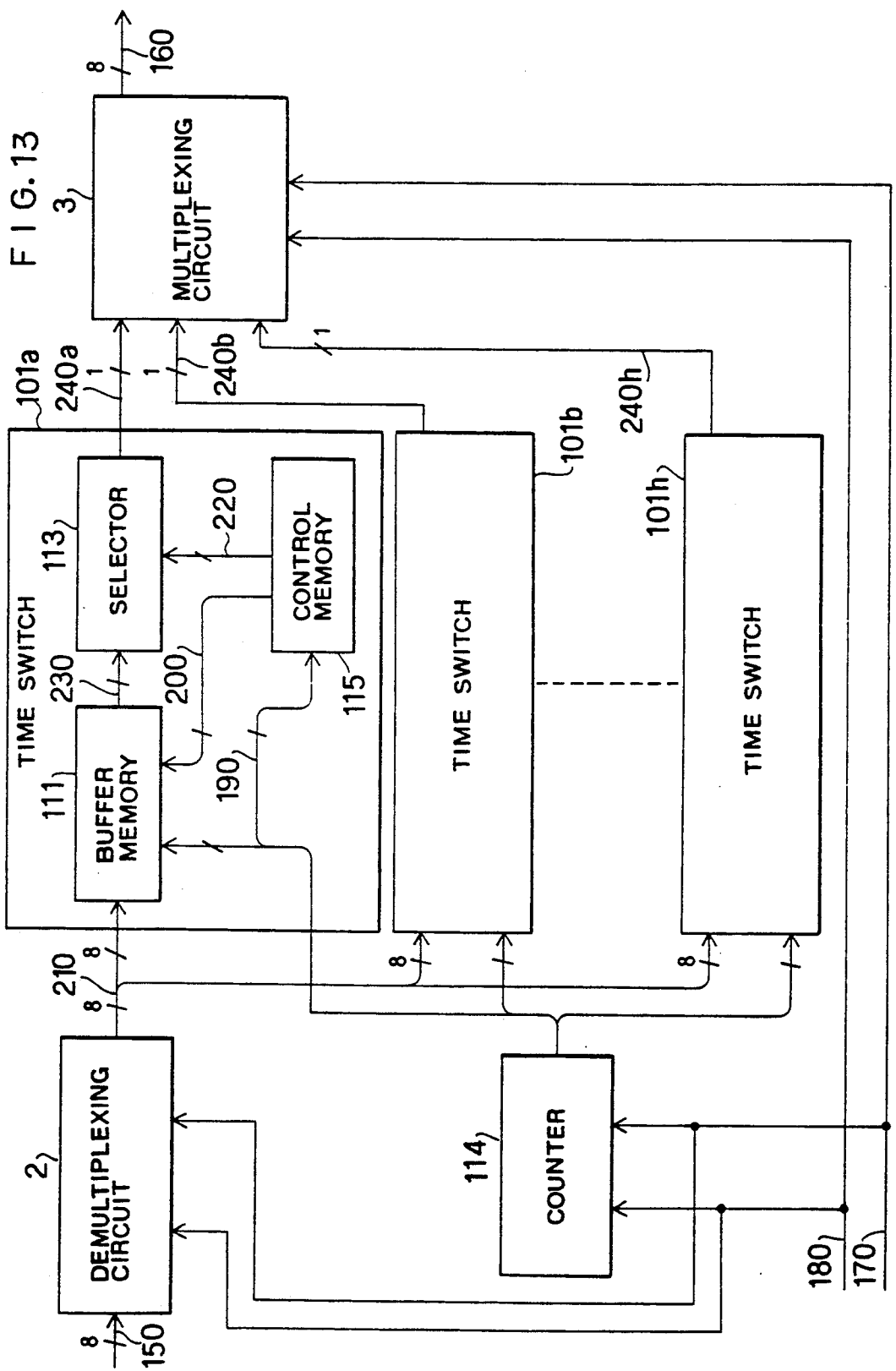

Although the counter 114 has been provided for each time switch in the above-described embodiment, each time switch may use a common counter 114 as shown in FIG. 13.

Figure 14:
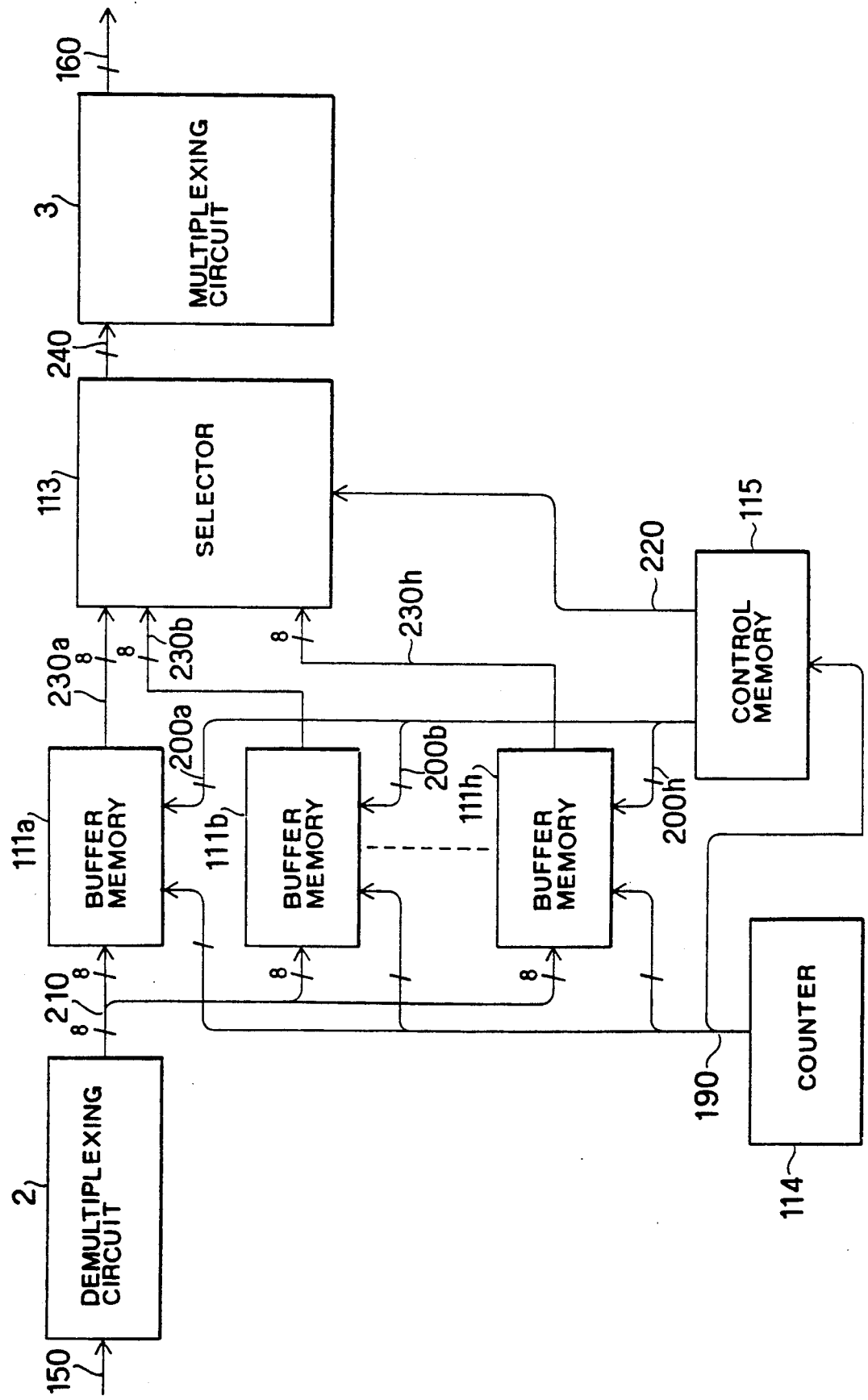

In the above-described embodiment, the selector and the control memory have been provided for each buffer memory. However, one selector and one control memory may controllably be provided with respect to all of the plural buffer memories, as shown in FIG. 14. In FIG. 14, numerals 200a, 200b, ..., 200h represent output addresses of buffer memories 111a, 111b, ..., 111h whereas numerals 230a, 230b, ..., 230h represent time position conversion data outputted from the buffer memories 111a, 111b, ..., 111h.

According to the first embodiment of the present invention, as has been described, the input data are input/output simultaneously as parallel data having a plurality of bits to/from a plurality of buffer memories, and a counter provided for each time switch and for selecting data corresponding to n bits out of the parallel data read from the respective buffer memories has been provided in the apparatus. Thus, the operation frequencies of the buffer memory and the control memory do not limit the quantity of data to be interchanged. It is therefore possible to interchange data of quantities larger than that in the conventional method at the same operation rate as that in the conventional method or at the operation rate less than that in the conventional method, and to realize the interchange of the bit unit as the minimum unit for the interchange, at the low operation rate as compared with the conventional method.

Figure 15:
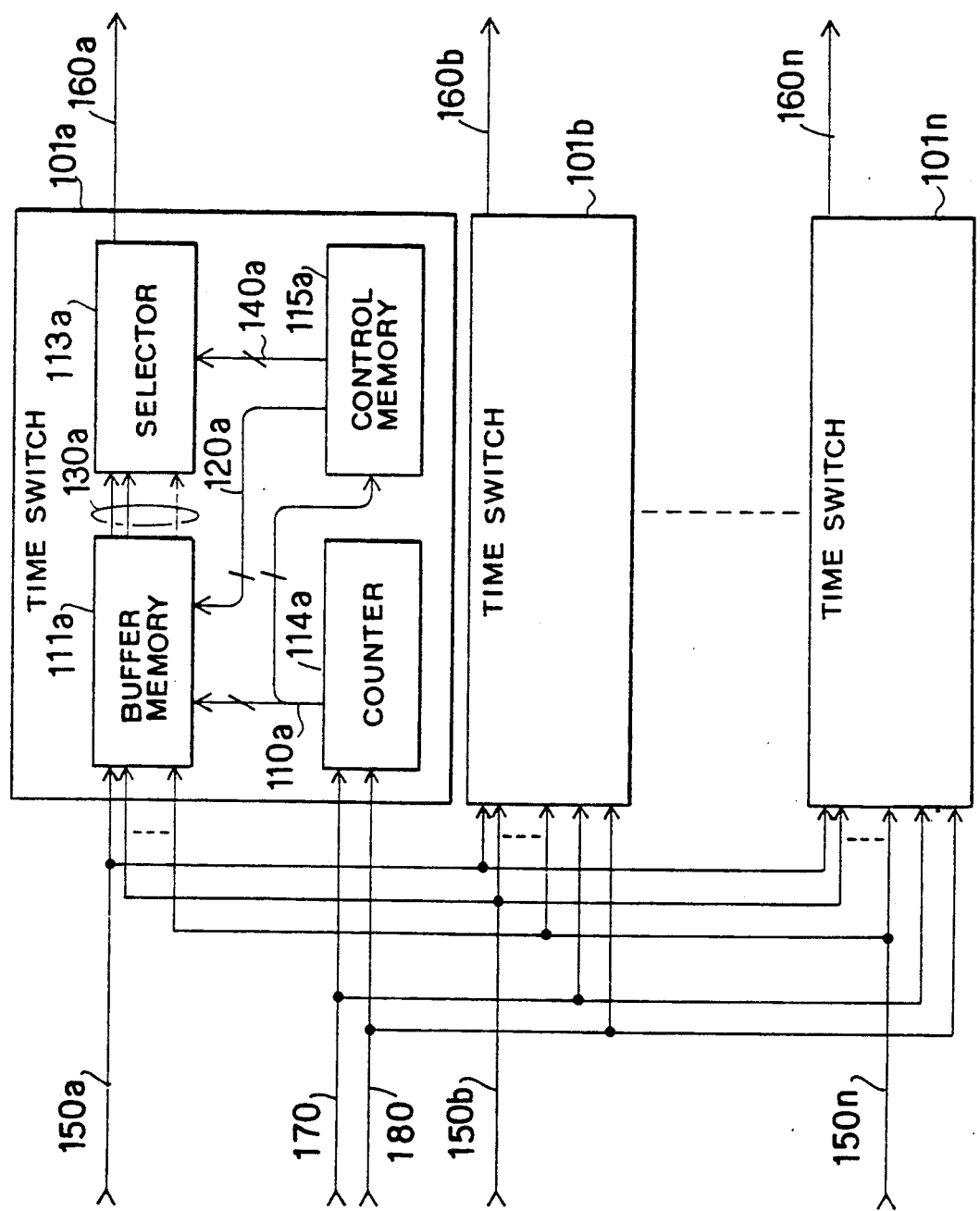
FIG. 15 is a block diagram showing the construction of a time division switching apparatus according to a second embodiment of this invention.
Figure 16:
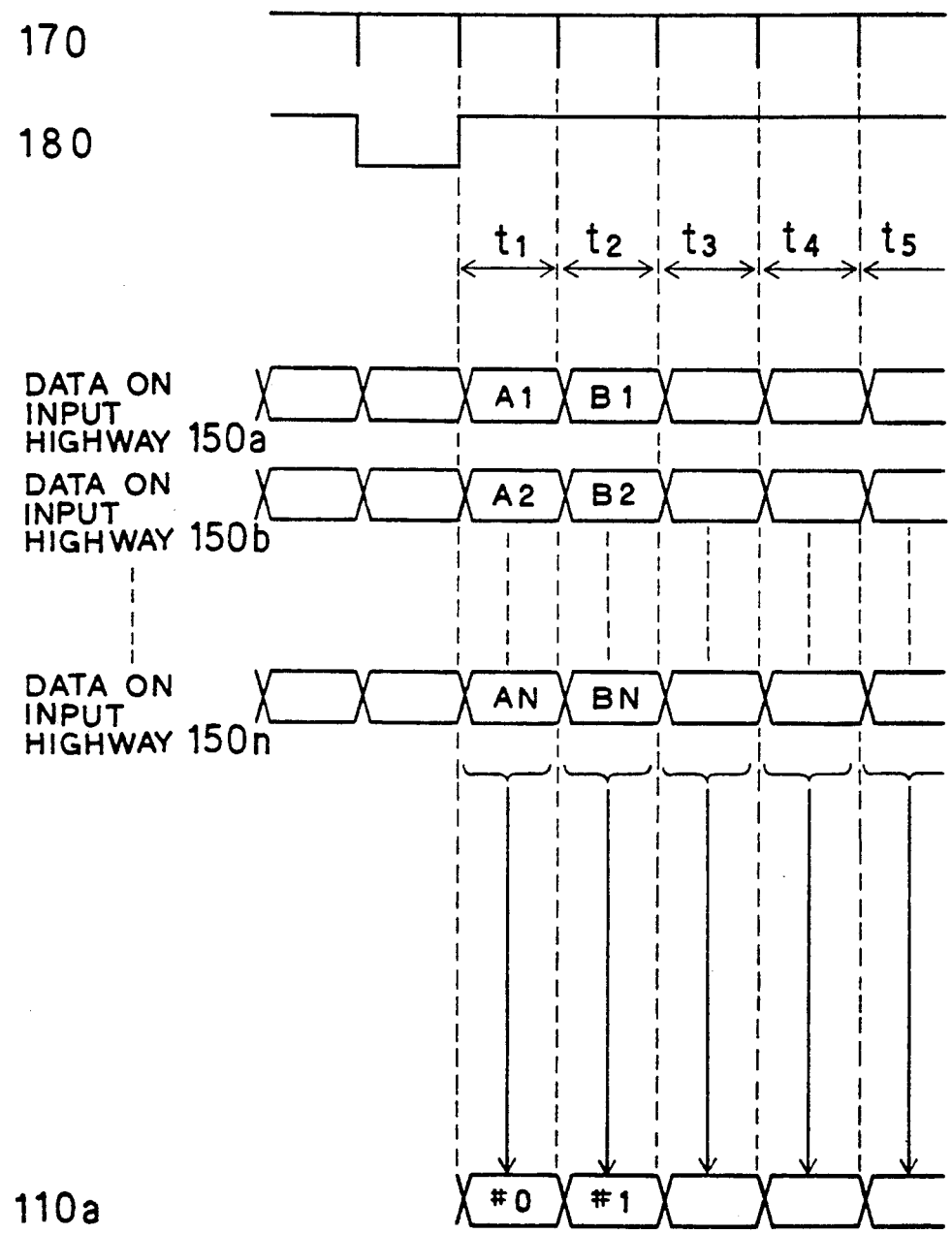
FIGS. 16 and 17 are timing charts for describing the operation of the second embodiment of FIG. 15.
Figure 17:
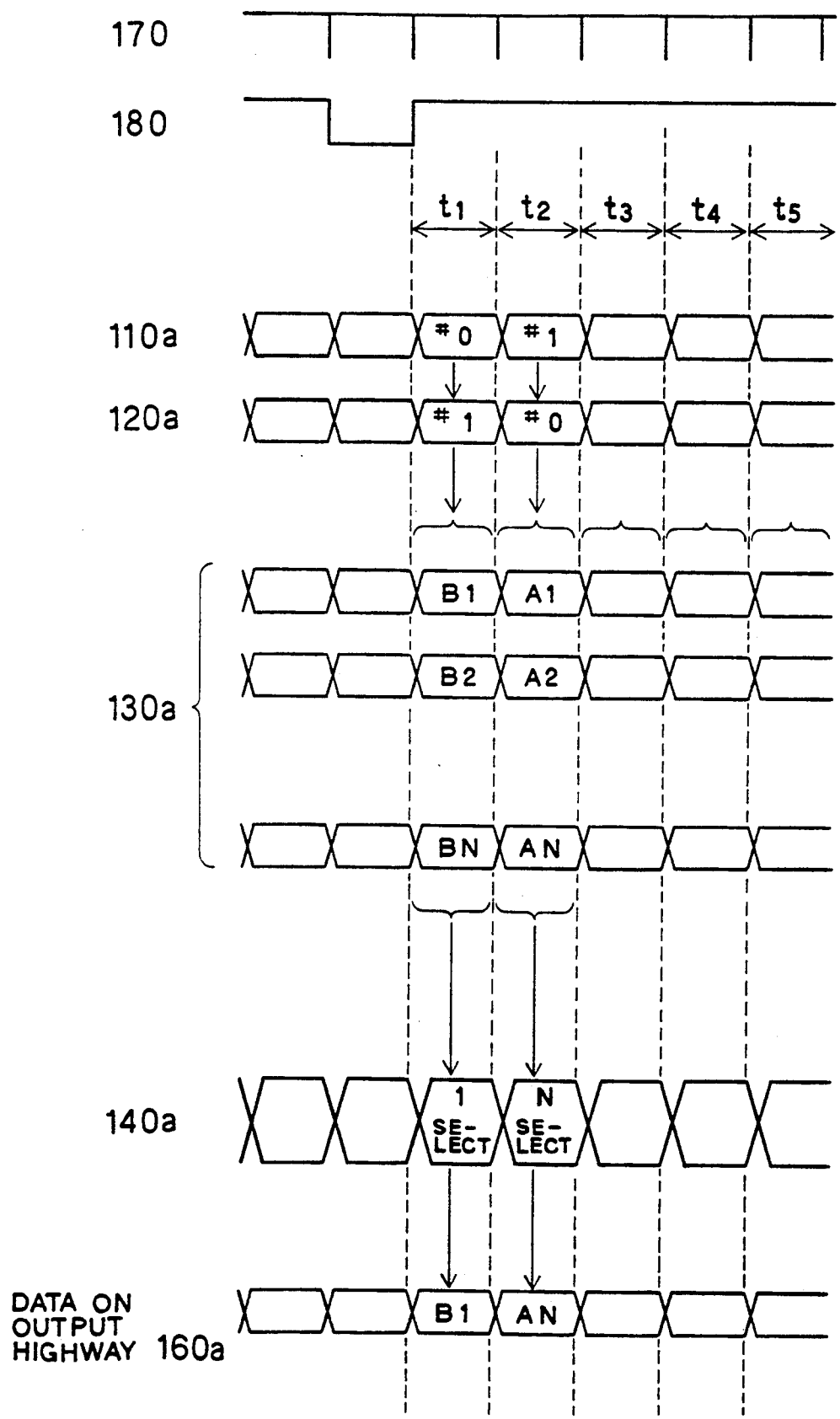

The second embodiment of the present invention will next be described with reference to the accompanying drawings. FIG. 15 shows the second embodiment of a time division switching apparatus according to the present invention. Referring now to FIG. 15, designated at numerals 101a, 101b, ..., 101n are time switches. The time switch 101a is constructed of a counter 114a, a control memory 115a, a buffer memory 111a and a selector 113a. Each of the time switches 101b, ..., 101n is also constructed in a manner similar to the time switch 101a referred to above. In addition, numerals 150a, 150b, ..., 150n indicate input highways, numerals 160a, 160b, ..., 160n output highways, numeral 170 a clock and numeral 180 a reference clock. FIG. 16 is a timing chart for describing the operation of writing data into the buffer memory shown 111a in FIG. 15. FIG. 17 is a timing chart for describing the operation of reading data from the buffer memory 111a and the selection operation of the selector 113a. As also shown in FIGS. 16 and 17 in the same manner as described above, each of symbols $t_1$, $t_2$, ... represents a time position corresponding to the bit unit, while the numerals marked on the left side of the sheet in the drawing correspond to input/output signals of individual circuits shown in FIG. 17.

The operation of the second embodiment will hereinafter be described with reference to FIGS. 15, 16 and 17.

In FIGS. 15 and 16, the time switch 101a receives all data from each of the input highways 150a, 150b, . . . , 150n and serves to write the data into each buffer memory 111a. An address to be written into each buffer memory 111a is subjected to the step-by-step operation of a clock 170 and then conforms to a value 110a counted by the counter 114a which serves to reset a counted value based on the reference clock 180 which is periodically generated.

FIG. 16 shows the manner in which each of data A1, A2, . . . , AN is written into an address indicated at symbol #0 at the time position $t_1$ whereas each of data B1, B2, . . . , BN is written into an address indicated at symbol #1 at the time position $t_2$.

The reading operation and the selection operation will next be described. Referring to FIG. 15, the counted value 110a is also supplied to the control memory 115a as an address. Then, the control memory 115a serves to read data, which have been stored in their corresponding addresses, based on control information, and applies the read data as a reading address 120a and a select code 140a to the buffer memory 111a and the selector 113a. The buffer memory 111a also supplies data, which have been written into the reading address 120a. as read data 130a, to the selector 113a. Then, the selector 113a serves to select any one of read data 130a in accordance with the select code 140a and to supply the selected data to an output highway 160a. A description will next be made to FIG. 17. The counter 114a serves to produce data #0 as the counted value 110a at the time position $t_1$. Then, the control memory 115a outputs data #1, which have been stored in the address #0, to the buffer memory 111a. Further, the buffer memory 111a serves to produce each of data B1, B2, . . . , BN, which have been stored in the address #1, to the selector 113a. Next, the select code 140a outputted from the control memory 115a is applied to the selector 113a, which in turn selects the data B1 out of the data B1, B2, . . . , BN to apply the same to the output highway 160a. The operation at the time position $t_2$ similar to that performed at the time position $t_2'$ as described above is performed at the time position $t_2$ and the data AN selected by the selector are applied to the output highway 160a.

The operation of each of the time switches 101b, . . . , 101n is also performed in the same manner as above-described operation.

It is thus possible to output arbitrary data on each input highway to an arbitrary time slot of each output highway when such interchange operation is performed. Thus, the interchange of data can be carried out between each input highway and each output highway.

Incidentally, in the above-described second embodiment, a description have been made on the method in which the data on each input highway and that on each output highway are treated as serial data and the interchange of the data has been performed at one bit unit. However, the data on each input highway and that on each output highway may be treated as parallel data in the form of N bits. In this case, if the unit for interchanging data is taken as an N-bit unit, the same data interchange as described above can be achieved.

According to the second embodiment of the present invention, as has been described, the time switch is provided for each input/output highway. Then, each time switch serves to receive the data from each input highway in each buffer memory, and to select a desired data from parallel data read in accordance with information stored within each control memory so as to supply the selected data to a corresponding output highway. It is thus possible to realize the time division switching apparatus on which no restrictions are imposed by the limit of the operation frequency employed in circuits such as a memory circuit, etc., said apparatus being capable of increasing the number of highways which are containable therein.

The third embodiment of the present invention will next be described with reference to the accompanying drawings.

Figure 18:
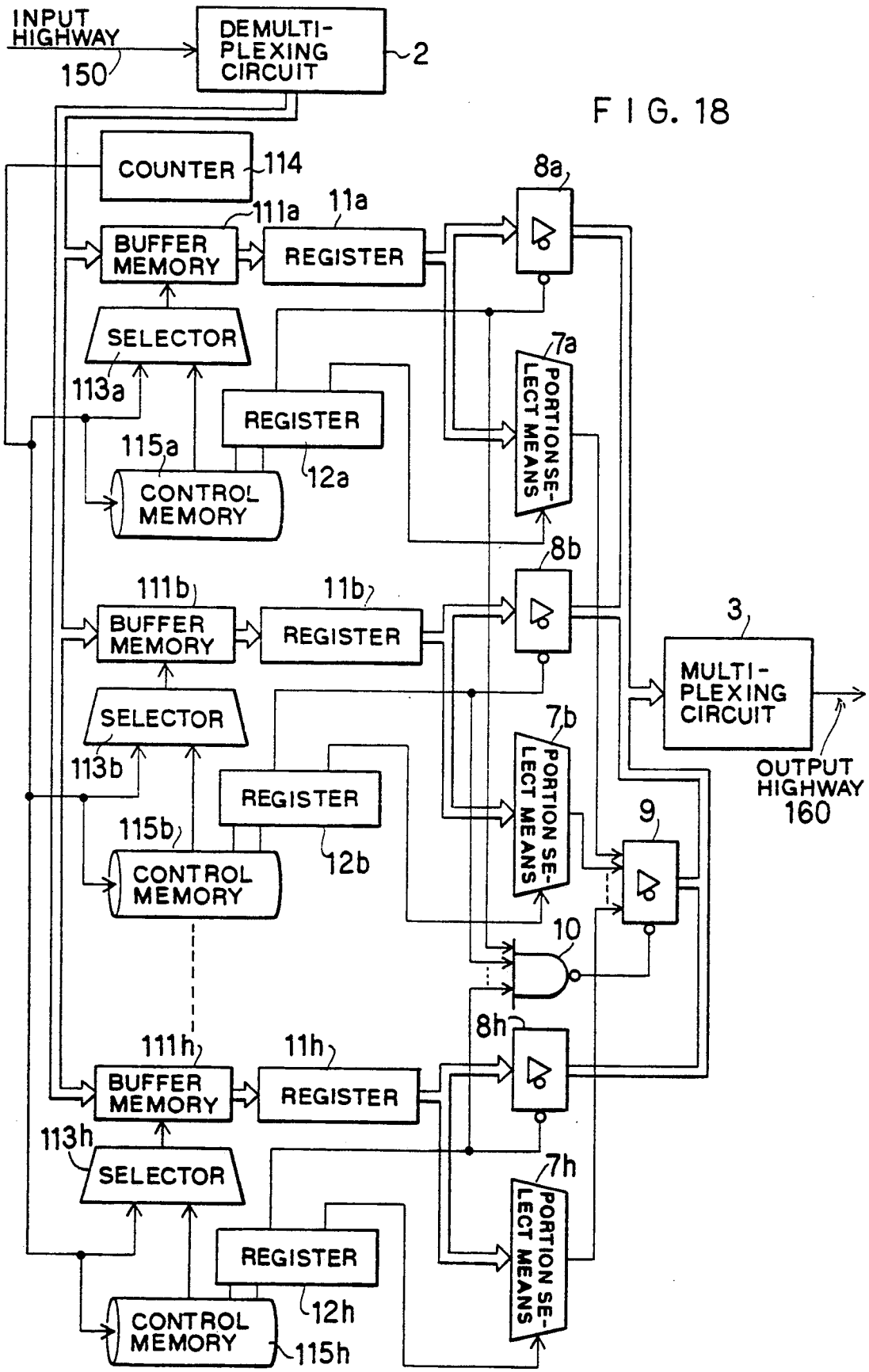
FIG. 18 is a block diagram showing the construction of a time division switching apparatus according to a third embodiment of the present invention.

FIG. 18 is a block diagram showing the construction of the third embodiment of the present invention. In the same drawing, there are shown buffer memories 111a, 111b, . . . , 111h, a counter 114, a demultiplexing circuit 2, a multiplexing circuit 3, control memories 115a, 115b, . . . , 115h, selector 113a, 113b, . . . , 113h select the output of the counter 114 in former half of the time slot, and select the output of the control memory in latter half thereof, as the address inputted into the buffer memory, portion select means 7a, 7b, . . . , 7h, time slot selector means 8a, 8b, . . . , 8h, a switch means 10, registers 11a, 11b, . . . , 11h for latching output signals from the memories 111a, 111b, . . . , 111h respectively, and registers 12a, 12b, . . . , 12h for latching output signals from the control memories 115a, 115b, . . . , 115h respectively. The present embodiment illustrates where multiplexed signals corresponding to 256 words by 1 bit (1 bit×256) are converted into multiplexed signals corresponding to 32 words by 8 bits (8 bits×32) represented in a parallel form, and the results are written into eight memories. In other words, the third embodiment shows where the number of the unit bits is equal to one (N=1), the number of bits to be multiplexed is equal to 256 (k=256), the number of parallel bits is equal to 8 (P=8), and the number of memories is equal to 8 (M=8). At this case, each of the memories 111a, 111b, . . . , 111h is constructed in the form of 32 words by 8 bits (8 bit×32). The counter 114 serves to count up an address data for each 8-bit cyclic time within addresses of 0 to 31. In addition, the present embodiment has adopted a sequential write and random read system in which each memory is constructed in the form of one-plane and the former half of the 8-bit cyclic time is treated as a read period whereas the latter half thereof is taken as a write period.

Figure 19:
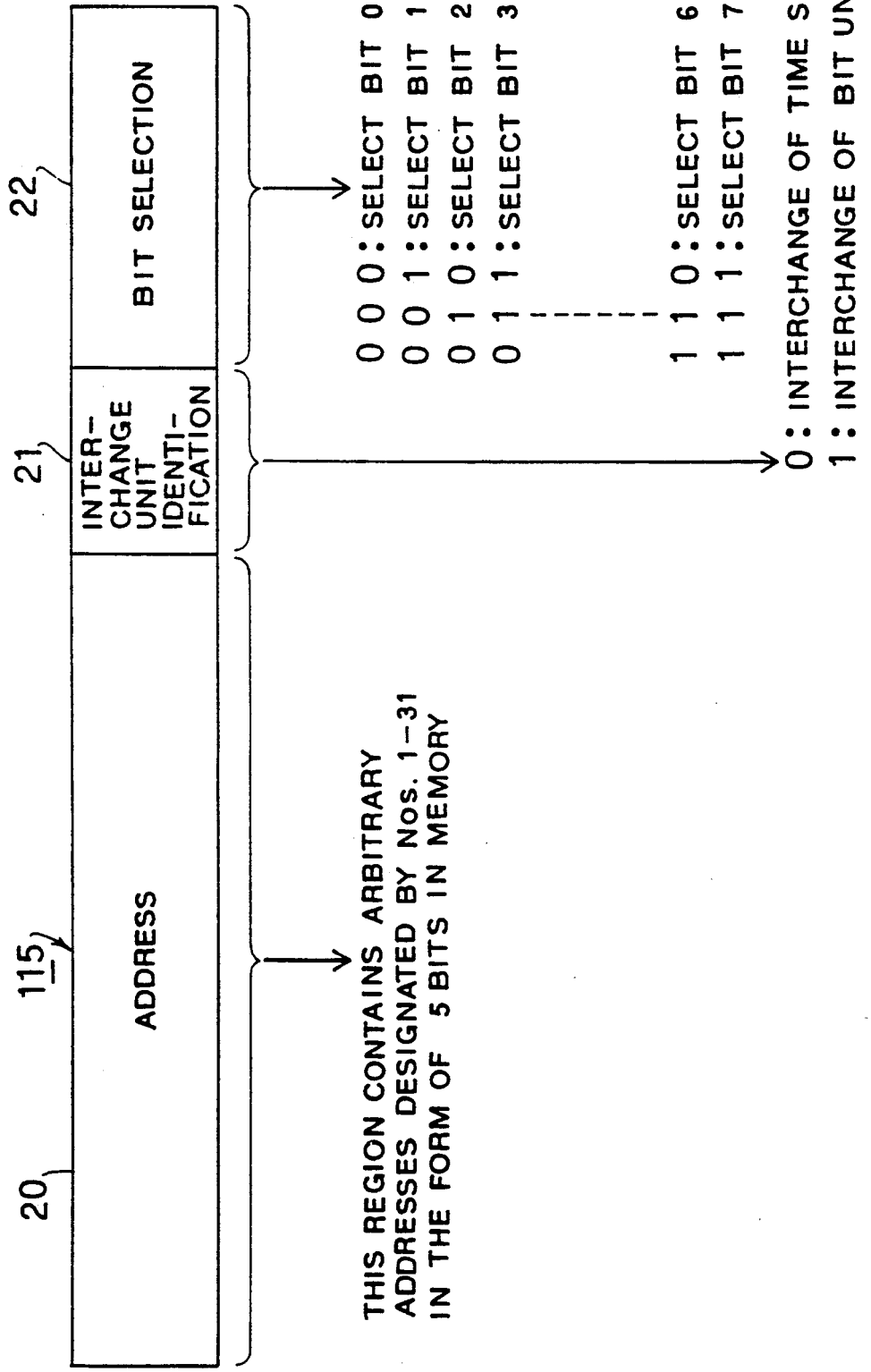
FIG. 19 is a diagram for describing the manner in which information is to be assigned to a control memory employed in the third embodiment of FIG. 18.

FIG. 19 illustrates a format showing the construction of the control memory 115 in the present embodiment. Designated at numeral 20 is control information used when the content of each memory 1 is read, and numeral 21 indicates interchange-unit identifying information. Numeral 22 indicates bit select information. In the present embodiment, the control information is represented in the form of 5 bits, the interchange-unit identifying information 21 is represented in the form of 1 bit, and the bit select information is represented in the form of 3 bits. Thus, the control memory 115 is made up of 32 words by 9 bits (9 bits×32) and then outputs the content of an address, i.e., location, with the state of each output from the counter 114 designated as the location. When the interchange-unit identifying information 21 is of "0", it means that the interchange of the time slot unit is performed. On the other hand, when it is of "1", it means that the interchange of the bit unit is performed. In addition, the bit select information 22 represents at which bit position a desired bit signal would be selected out of 8-bit signals read from each memory 1 based on a 3-bit code. When the 3-bit code is of "000", 0th bit is selected. When it is of "001", 1th bit is selected and when it is of "110", 6th bit is chosen. In addition, when it is of "111", 7th bit is selected.

Each of the portion select means $7a, 7b, \ldots, 7h$ serves to select 1-bit signal out of 8-bit signals representing outputs from the registers $11a, 11b, \ldots, 11h$ in accordance with the bit select information 22 from each of the control memories $115a, 115b, \ldots, 115h$, and then to apply the selected signal to an assembly means 9. At this case, an output signal from the portion select means $7a$ corresponds to the least significant bit signal out of the 8-bit signals inputted to the assembly means, and an output signal from the portion select means $7h$ corresponds to the most significant bit signal out of the 8-bit signals inputted thereto.

Let's here assume that the least significant bit signal out of the 8-bit signals (time slots) is conveyed over the input highway 150 and the output highway 160 at the head of the queue.

When the interchange-unit identifying information 21 of each of the control memories $115a, 115b, \ldots, 115h$ is of "0", each of the time slot selector means $8a, 8b, \ldots, 8h$ serves to produce an 8-bit signal from each of the registers $11a, 11b, \ldots, 11h$, and then to apply the same to the multiplexing circuit 3. When it is of "1", each time slot selector means is brought into a high-impedance state. In the present embodiment, only one of the eight control memories $115a, 115b, \ldots, 115h$ is applied where the interchange-unit identifying information 21 becomes "0". When the interchange-unit identifying information 21 of all the control memories 115 is of "1", an output from the switch means is brought into "L" level state, so that an output from the assembly means 9 is brought into an enable state. The output from the portion select means 7 is applied to the multiplexing circuit 3 through the assembly means 9. The multiplexing circuit 3 serves to convert a multiplex signal representing 32 words by 8 bits (8 bits×32) into a multiplex signal representing 256 words by 1 bit (1 bit×256) from a low-order bit of a 8-bit word, and to deliver the same to the output highway 160.

The multiplex signal representative of 256 words by 1 bit (1 bit×256) inputted from the input highway 150 is converted into a multiplex signal representing 32 words by 8 bits (8 bits×32) by the demultiplexing circuit 2, and the converted multiplex signal is applied simultaneously to each of the buffer memories $111a, 111b, \ldots, 111h$ and then written therein in accordance with a writing address as an output from the counter 114, which is applied to each memory via each of the selectors $113a, 113b, \ldots, 113h$ during the write period. The 8-bit signals are read out from the buffer memories $111a, 111b, \ldots, 111h$ respectively in accordance with the address information 20 as the output from each of the control memories $115a, 115b, \ldots, 115h$, which is applied through each of the selectors $113a, 113b, \ldots, 113h$ during the read period referred to above, and the read signals are latched by the registers $11a, 11b, \ldots, 11h$ respectively.

Figure 20A:
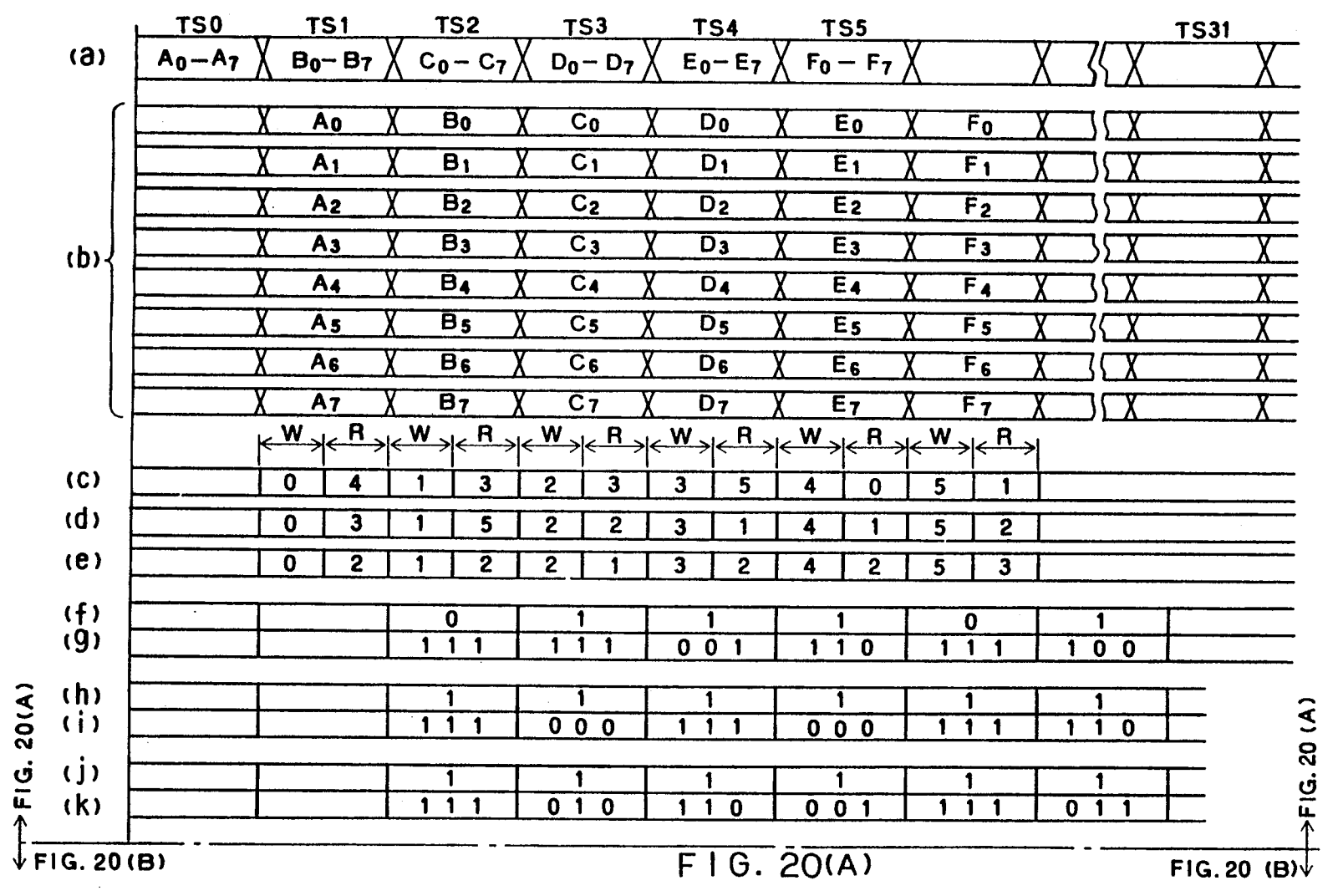

FIG. 20 is a diagram for describing the operation of the third embodiment shown in FIG. 18, in which symbol (a) indicates multiplexed signals representative of 256 words by 1 bit (1 bit×256) on the input highway, and 8-bit signals corresponding to time slots of TS0–TS6 out of time slots of TS0–TS31 are represented by symbols $A_0$–$A_7$, $B_0$–$B_7$, $C_0$–$C_7$, $D_0$–$D_7$, $E_0$–$E_7$ and $F_0$–$F_7$. Further, this drawing also shows where the interchange of the time slot units from TS0 to TS4 and from TS4 to TS0 is carried out, and the interchange of the bit unit between bit 0 to bit 1 of the time slot TS1 and bit 1 to bit 2 of the time slot TS3 is performed, likewise, between bit 2 to bit 3 of the time slot TS1 and bit 4 to bit 5 of the time slot TS3, between bit 4 of the time slot TS1 and bit 0 of the time slot TS5, between bit 5 of the time slot TS1 and bit 4 of the time slot TS5, between bit 6 of the time slot TS1 and bit 7 of the time slot TS2, between bit 7 of the time slot TS1 and bit 5 of the time slot TS5, between bit 0 to bit 1 of the time slot TS2 and bit 6 to bit 7 of the time slot TS3, between bit 2 of the time slot TS2 and bit 7 of the time slot TS1, between bit 3 of the time slot TS2 and bit 6 of the time slot TS5, between bit 4 to bit 5 of the time slot TS2 and bit 2 to bit 3 of the time slot TS5, between bit 6 of the time slot TS2 and bit 1 of the time slot TS5, between bit 7 of the time slot TS2 and bit 1 of the time slot TS2, between bit 7 of the time slot TS2 and bit 1 of the time slot TS2, between bit 0 of the time slot TS3 and bit 2 of the time slot TS2, between bit 1 of the time slot TS3 and bit 0 of the time slot TS2, between bit 2 of the time slot TS3 and bit 3 of the time slot TS2, between bit 3 of the time slot TS3 and bit 7 of the time slot TS5, between bit 4 to bit 6 of the time slot TS3 and bit 3 to bit 5 of the time slot TS1, between bit 7 of the time slot TS3 and bit 0 of the time slot TS1, between bit 0 to bit 1 of the time slot TS5 and bit 1 to bit 2 of the time slot TS1, between bit 2 to bit 4 of the time slot TS5 and bit 4 to bit 6 of the time slot TS2, between bit 7 of the time slot TS2 and bit 1 of the time slot TS2, between bit 5 of the time slot TS5 and bit 3 of the time slot TS3, between bit 6 of the time slot TS5 and bit 0 of the time slot TS3, and between bit 7 of the time slot TS5 and bit 6 of the time slot TS1.

Symbol (b) represents each output from the demultiplexing circuit 2, i.e., each signal to be applied to each of the buffer memories $111a, 111b, \ldots, 111h$, whereas symbol (c) indicates an address signal applied to the buffer memory $111a$. Symbol (d) indicates an address signal applied to the buffer memory $111b$, and symbol (e) represents an address signal applied to the buffer memory $111h$. In addition, symbols (f) and (g) represent interchange-unit identifying information and bit select information to be outputted from the control memory $115a$ respectively, while symbols (h) and (i) indicate interchange-unit identifying information and bit select information. Symbols (j) and (k) represent interchange-unit identifying information and bit select information. Symbol (l) indicates an output signal from the portion select means $7a$, while symbol (m) represents an output signal from the portion select means $7b$. Symbol (n) represents an output signal from the portion select means $7h$, while symbol (p) indicates an enable signal outputted from the time slot selector means $8a$. In addition, symbol (q) indicates an output signal from the switch means (an output enable signal from the assembly means 9), while symbol (r) represents signals to be inputted to the multiplexing circuit 3. Furthermore, symbol (s) represents a signal to be delivered to the output highway Symbols W and R represent write and read periods respectively.

The 8-bit signals $A_0$–$A_7$ corresponding to the time slot TS0 on the input highway 150 are converted into such 8-bit parallel signals as indicated at the symbol (b) by the demultiplexing circuit 2, and the converted signals are applied to each of the buffer memories $111a$, $111b, \ldots, 111h$. The respective 8-bit signals of $B_0$–$B_7$, $C_0$–$C_7$, . . . corresponding to the individual time slots TS1, TS2, . . . to be formed successively are also converted into 8-bit parallel signals in a manner similar to that referred to above, and the converted signals are then applied to each of the buffer memories 111a, 111b, ..., 111h.

Where the sequential write and random read system is employed, each of the selectors 113a, 113b, ..., 113h serves to select each output signal from the counter 114, and to apply the same as a writing address signal to each of the buffer memories 111a, 111b, ..., 111h during the write period W, while each of the selectors 113a, 113b, ..., 113h serves to select each of address signals from the control memories 115a, 115b, ..., 115h so as to apply the same as a reading address signal to each of the buffer memories 111a, 111b, ..., 111h. Thus, when the 8-bit signals of $A_0$-$A_7$ are applied to each of the buffer memories 111a, 111b, ..., 111h, the writing address signal from the counter 114 is brought to "0", and the same signals of $A_0$-$A_7$ are written into a location 0 of each of the buffer mexories 111a, 111b, ..., 111h. During the following read period R, a reading address signal from the control memory 115a becomes "4", a reading address signal from the control memory 115b becomes "3", and a reading address signal from the control memory 115h becomes "2". Thus, 8-bit signals of $E_0$-$E_7$ (signals which have been written into a previous frame) are read out from a location 4 in the memory 1a, 8-bit signals of $D_0$-$D_7$ are read from a location 3 in the memory 1b, and 8-bit signals of $C_0$-$C_7$ are read from a location 2 in the memory 1h.

The signals, which have been read out from the buffer memories 111a, 111b, ..., 111h, are latched by the registers 11a, 11b, ..., 11h. At this time, each interchange-unit identifying information 21 and each bit select information 22, which have been read from each of the control memories 115a, 115b, ..., 115h, are latched by each of the registers 12a, 12b, ..., 12h. Each of output signals from the registers is represented by the symbols (f), (g), (h), (i), (j), and (k). Each bit select information 22, which has been latched by each of the registers 12a, 12b, ..., 12h, is all represented by "111" as indicated at the symbols (g), (h), (i), ..., (k). Each of the portion select means 7a, 7b, ..., 7h produces a signal representative of a bit 7 from a 8-bit input signal outputted from each of the registers 11a, 11b, ..., 11h in accordance with such a signal referred to above, as indicated at the symbols (l), (m), and (n), and then applies the produced signal to the assembly means 9. At this time, each interchange-unit identifying information 21, which has been latched by each of the registers 12a, 12b, ..., 12h is represented by each of "0", "1", ..., "1" as indicated at the symbols (f), (h), ..., (j). Thus, the output enable signal from the time slot select means 8a is only brought into an enable state as indicated at the symbol (p). As a consequence, the 8-bit signals of $E_0$-$E_7$ read from the buffer memory 111a are applied to the multiplexing circuit 3 through the time slot select means 8a as indicated at the symbol (r). After converting of the signals into signals represented in a multiplex form, the multiplexed signals are delivered to the output highway.

As described above, when the interchange-unit identifying information 21 from the control memory 115 represents a time slot unit "0", the corresponding control information 20 designated by the control memory 115 is only effective. On the other hand, when the interchange-unit identifying information 21 means a bit unit "1", the corresponding control information 20 outputted from the control memory 115 will mean little whatever its content follows. At this time, all the bit select information 22 from the control memory 115 will not make sense either. Thus, if the memory (1), which serves to perform the interchange of the time slot unit, is fixed, it is only necessary to reestablish only the control information 20 outputted from the control memory 115 and used to control the memory (1) which serves to perform the interchange of the time slot unit, and the interchange-unit identifying information 21, upon interchange of the time slot unit.

When the 8-bit signals of $B_0$-$B_7$ indicated at the following symbol (b) are applied to each of the buffer memories 111a, 111b, ..., 111h, a writing address signal from the counter 114 is represented by "1", so that the signals of $B_0$-$B_7$ are written into the location 1. In addition, the reading address signals from the control memories 115a, 115b, ..., 115h are represented by "3", "5", ..., "2". Thus, signals of $D_0$-$D_7$ are read out from the location 3, signals of $F_0$-$F_7$ are read out from the location 5, ..., and signals of $C_0$-$C_7$ are read from the location 2, and their reading signals are latched by the registers 11a, 11b, ..., 11h. At this time, the interchange-unit identifying information 21, which has been read from each of the control memories 115a, 115b, ..., 115h, and latched by the registers 12a, 12b, ..., 12h, is all represented by "1" (bit unit) as indicated at the symbols (f), (g), (h), (i), ..., (k), while the bit select information 22 is represented by "111", "000", ..., "010" as indicated at the symbols (f), (g), (h), (i), ..., (k). Then, the portion select means 7a, 7b, ..., 7h produces signals $D_7$, $F_0$, ..., $C_2$ respectively, as indicated at the symbols (l), (m), ..., (n). Since the interchange-unit identifying information 21, which has been latched by the registers 12a, 12b, ..., 12h, is all represented by "1", an output from the switch means is brought into "L" level as indicated at the symbol (q), so that an output enable signal from the assembly means 9 becomes an enable state. To the contrary, output enable signals from other time slot select means 8a, 8b, ..., 8h are brought into "H" level as indicated at the symbol (p) by way of example, so that each of the output enable signals becomes a disable state. Thus, outputs from the portion select means 7a, 7b, ..., 7h are applied to the parallel/serial converter 3 through the assembly means as indicated at the symbol (r), followed by conversion of the same in the multiplex form by the parallel/serial converter 3, and the converted outputs therefrom are then fed to the output highway.

The interchange of the time slot unit and the bit unit is hereinafter performed by the control similar to that employed in the above case.

Figure 1:
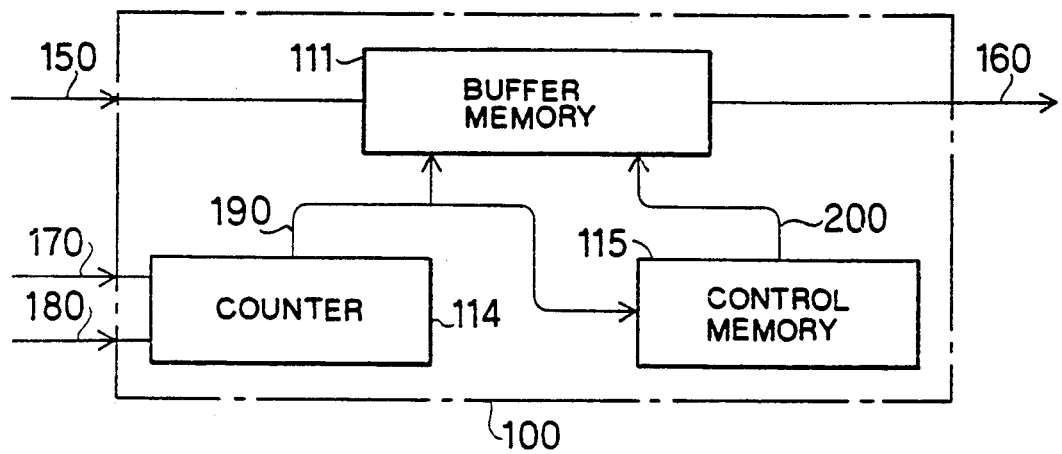
FIG. 1 is a block diagram showing the construction of a conventional time division switching apparatus.
Figure 4:
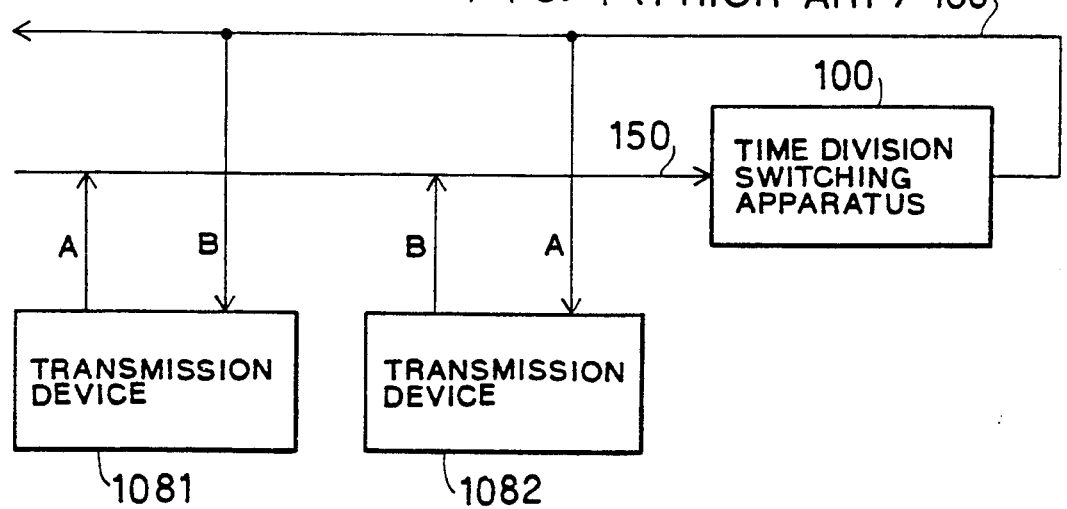
FIG. 4 is a block diagram for describing the interchange of data executed by the conventional time division switching apparatus.
Figure 2:
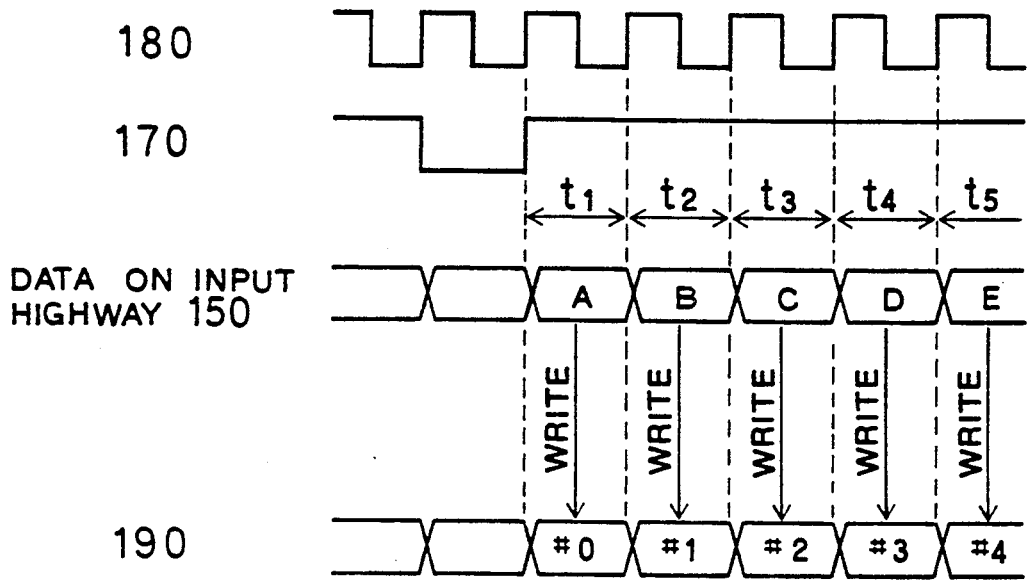
FIGS. 2 and 3 are timing charts each for describing the operation of the conventional time division switching apparatus.
Figure 3:
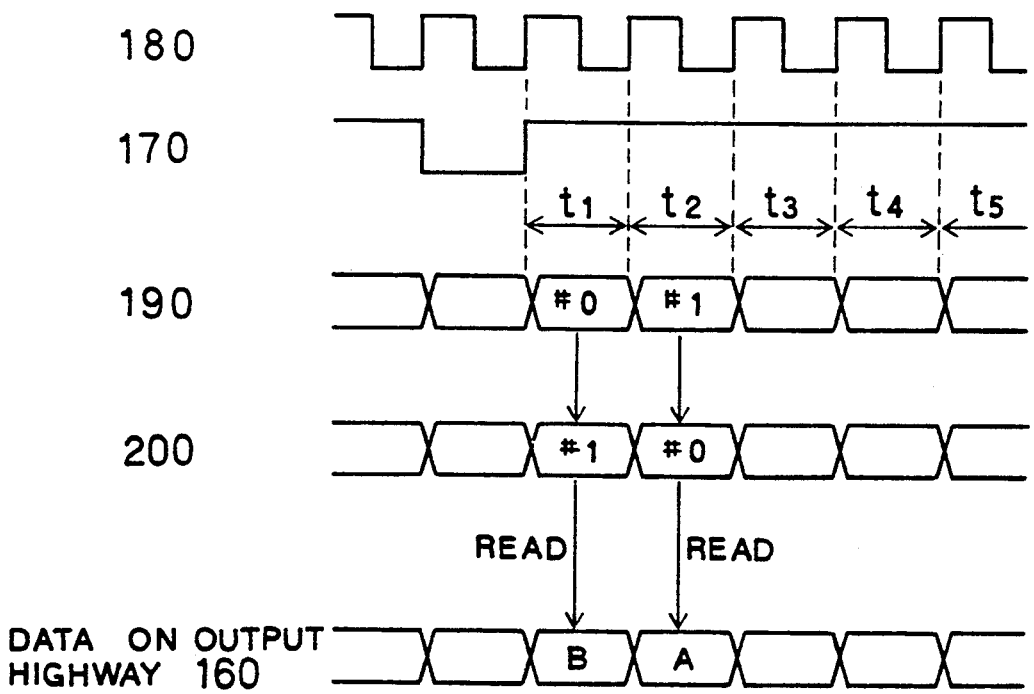
Figure 5:
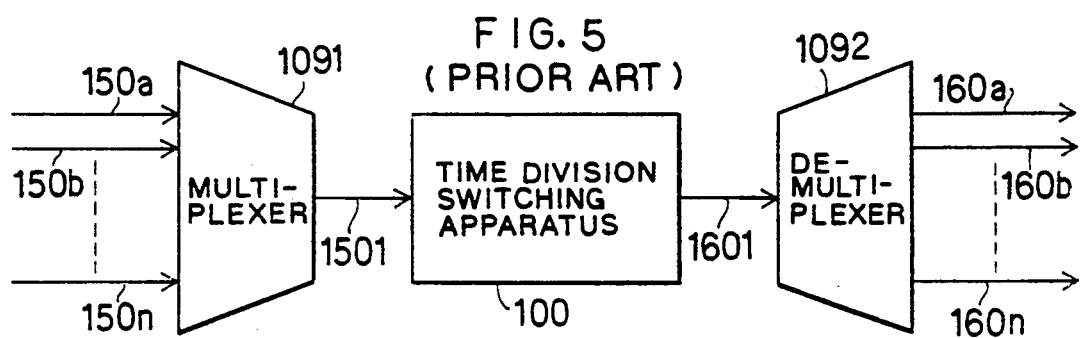
FIG. 5 is a diagram illustrative of a plurality of highways accommodated for connection in the conventional division switching apparatus.
Figure 6:
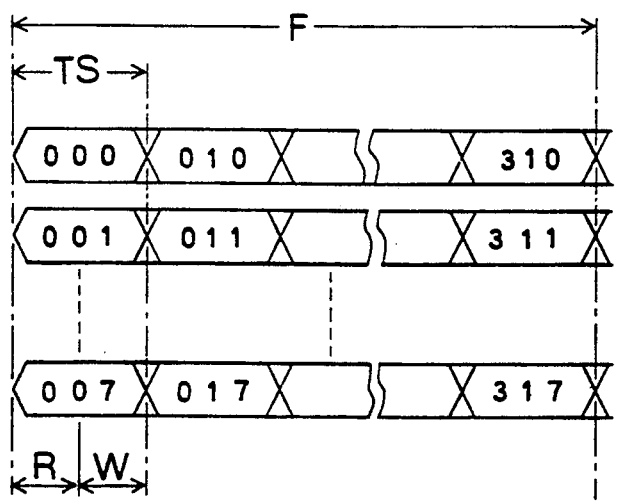
FIG. 6 is a diagram for describing the operation of the apparatus shown in FIG. 1.

Although the writing is performed in former half of one time slot and the reading is performed in latter half thereof, as explained in FIG. 1, FIG. 2 and FIG. 3, it is possible to adapt the method in which read/write is performed by using the frame as unit. Since in this case, there are provided two buffer memories, and writing or reading is interchanged each other every frame, the function equivalent to that employed in the above-described embodiment can be achieved using a memory having the access speed slower by ½ than that employed in the above-described embodiment. In other words, when the memories each having the same access speed is employed, the interchange process of signals can be performed at double the speed.

As is understood from the above description, where it is desired to convert each of signals multiplexed in the form of k by N bit and received from the input highway into each signal represented in the form of $P \times N$ bits, to write simultaneously each of the converted signals into memories each having k/P words by $P \times N$ bits of M pieces, and to read out simultaneously $P \times N$ bits of M pieces from each of the memories so as to perform the interchange of the bit unit, each of desired signals is selected bit by bit, and the selected signal is multiplex-converted into a signal represented in the form of k by N bits again by the multiplexing circuit so as to be fed to the output highway. On the other hand, when it is desired to perform the interchange of the time slot, each of desired signals is selected 8 bit by 8 bit (corresponding to a time slot) from $P \times N$ bits representing $P \times N/8$ pieces, out of the read $P \times N$ bits of M pieces, and the selected signal is converted into a multiplex signal represented in the form of k by N bits again by the multiplexing circuit, so that the converted signal is delivered to the output highway. When $P \times N > M$, it is possible to perform the interchange process of the bit unit or time slot unit with respect to signals each having the speed of M/2N times the access time for each memory, or M/N times the access time therefor. On the other hand, when $P \times N \leq M$, the interchange process of the bit unit or time slot unit can be performed with respect to signals each having the speed of P/2 times the access times for each memory or P time the access time therefor. In addition, the interchange-unit identifying information for identifying either the interchange of the bit unit or the interchange of the time slot unit is established as information to be set in the control memory. Where the content in the control memory with respect to a certain memory means the interchange of the time slot unit, a signal corresponding to a time slot length is selected only out of signals read from a memory including the content representing the interchange of the time slot unit, and the selected signal is then delivered to the output highway through the multiplexing circuit. Therefore, the designation of the interchange of the time slot unit as well as the ability to perform the interchange of the bit unit can also be achieved by means of information having the length substantially equal to that of information to be set to the control memory employed in a conventional time division channel switch, which can perform only the interchange of the time slot unit, by means of the number of information to be set to the control memory, which is substantially equal to that employed in the conventional time division channel switch.

As has been described, the third embodiment according to the present invention can bring about advantages that the interchange of the time slot unit and that of the bit unit can both be performed without the need for making faster the operation speed of the buffer memory or control memory, and address information established in the control memory can be reduced upon interchange of the time slot unit.

Having now fully described the invention, it will be apparent to those skilled in the art that many changes and modifications can be made without departing from the spirit or scope of the invention as set forth herein.

What is claimed is:

1. A time division switching apparatus for receiving data from an input highway, interchanging a portion of the data, and sending data to an output highway, comprising:

a demultiplexing circuit for converting data received serially from the input highway to parallel data;

a plurality of time switches each having means for receiving said parallel data and means for selecting a predetermined portion thereof as output data; and a multiplexing circuit for receiving said predetermined portions of data outputted from each of said plurality of time switches converting said portions to serial data and sending said converted serial data to the output highway.

2. The time division switching apparatus of claim 1, wherein each time switch comprises:

a buffer memory for storing the parallel data received from the demultiplexing circuit;

a counter for generating a writing address of the buffer memory for storing the parallel data in the buffer memory;

a control memory for storing control information to read and select the parallel data stored in said buffer memory; and a selector for selecting a predetermined unit of data from the parallel data read from the buffer memory based on said control information.

3. A time division switching apparatus for receiving data from an input highway, interchanging a portion of the data, and sending data to an output highway, comprising:

a demultiplexing circuit for converting data received serially from the input highway into parallel data of predetermined parallel data units;

a plurality of time switches each having means for receiving and storing said parallel data and means for selecting predetermined portions of data from said parallel data as output data;

a counter for generating a writing address of each of said means for receiving for storing said parallel data therein; and a multiplexing circuit for converting output data from said plurality of time switches to serial data and sending said converted serial data to the output highway.

4. The time division switching apparatus of claim 3, wherein each time switch comprises:

a buffer memory for storing the parallel data received from the demultiplexing circuit;

a control memory for storing control information to read and select the parallel data stored in said buffer memory; and a selector for selecting a predetermined unit of data from said parallel data read from the buffer memory based on said control information.

5. A time division switching apparatus for receiving data from an input highway, interchanging a portion of the data, and sending data to an output highway, comprising:

a demultiplexing circuit for converting data received serially from the input highway into parallel data of predetermined parallel data units;

a plurality of buffer memories for storing said parallel data received from said demultiplexing circuit;

a counter for generating a writing address of each of said buffer memories for storing said parallel data therein;

a control memory for storing control information to read and select the parallel data stored in said plurality of buffer memories; and a selector for selecting a predetermined unit of data from each of said parallel data read from said buffer memories based on said control information; and a multiplexing circuit for converting said predetermined units of data selected by said selector into serial data and sending said converted serial data to the output highway.

6. The time division switching apparatus of claim 2, 4 or 5, wherein the control information includes:
- a reading/writing address of a buffer memory for reading/writing parallel data from/to the buffer memory; and
- a select code to be sent to said selector for selecting the predetermined unit of data from the parallel data read from the buffer memory.

7. The time division switching apparatus of claim 6, wherein
- the data received from the input highway is one bit serial data;
- the parallel data converted by the multiplexing circuit have at least two bits; and
- the select code is a bit position code of the parallel data read from the buffer memory.

8. A time division switching apparatus for serially receiving N bit parallel data (N=2,3,4, . . . ) from an input highway, interchanging a portion of the data and sending data to an output highway, comprising:
- a plurality of time switches each having means for receiving the N bit parallel data and sending a predetermined portion of said parallel data to said output highway.

9. The time division switching apparatus of claim 8, wherein each time switch comprises:
- a buffer memory for storing the N bit parallel data received from the input highway;
- a counter for generating a writing address of said buffer memory for storing the N bit parallel data therein;
- a control memory for storing control information to read and select the stored parallel data; and
- a selector for selecting said predetermined portion of said parallel data stored in the buffer memory based on the control information.

10. A time division switching apparatus for serially receiving N bit parallel data (N=2,3,4, . . . ) from an input highway, interchanging a portion of the data, and sending data to an output highway, comprising:
- a plurality of time switches, each having means for receiving and storing the N bit parallel data and means for sending a predetermined number of bits of the N bit parallel data to said output highway; and
- a counter for generating a writing address of said means for receiving for storing the N bit parallel data therein.

11. The time division switching apparatus of claim 10, wherein each of said plurality of time switches comprises:
- a buffer memory for storing the N bit parallel data received from the input highway;
- a control memory for storing control information to read and select parallel data stored in said buffer memory; and
- a selector for selecting said predetermined number of bits of the N bit parallel data stored in said buffer memory based on said control information.

12. A time division switching apparatus for serially receiving N bit parallel data (N=2,3,4, . . . ) from an input highway, interchanging a portion of the data, and sending data to an output highway, comprising:
- a plurality of time switches, each having a buffer memory for receiving and storing the N bit parallel data and means for sending a predetermined number of bits of the N bit parallel data to said output highway;
- a counter for generating a writing address of said buffer memory for storing said N bit parallel data therein;
- a control memory for storing control information to read and select the parallel data stored in said buffer memories; and
- a selector for selecting said predetermined number of data from the parallel data stored in said buffer memories based on the control information.

13. The time division switching apparatus of claim 9, 11, or 12, wherein said control information includes:
- a reading address of a buffer memory for reading the N bit parallel data stored therein; and
- a select code to be sent to the selector for selecting a predetermined number and predetermined position of bit/bits of the N bit parallel data read out from said reading address.

14. A time division switching apparatus for receiving data from an input highway, interchanging a portion of the data, and sending data to an output highway, comprising:
- a demultiplexing circuit for converting N bit data received serially from the input highway to N×P bit parallel data where N and P are integers;
- a plurality of time switches for receiving the N×P bit parallel data and outputting a predetermined portion of N bit parallel data of the received N×P parallel data; and
- a multiplexing circuit for converting N bit parallel data outputted by the plurality of time switches to an N bit unit of serial data and sending said converted serial data to the output highway.

15. The time division switching apparatus of claim 14, wherein each time switch comprises:
- a buffer memory for storing the N×P bit parallel data in the buffer memory;
- a counter for generating a writing address of the buffer memory for storing the N×P bit parallel data in the buffer memory;
- a control memory for storing control information to read and select the parallel data stored in said buffer memory; and
- a selector for selecting said predetermined unit of N bit data of the N×P parallel data stored in the buffer memory based on the control information.

16. A time division switching apparatus for receiving data from an input highway, interchanging a portion of the data, and sending data to an output highway, comprising:
- a demultiplexing circuit for converting N bit data received serially from the input highway to N×P bit parallel data of predetermined parallel data units;
- a plurality of time switches each having a buffer memory for receiving the N×P bit parallel data, each of the time switches outputting a predetermined portion of N bit data from the received N×P parallel data;
- counter means for generating a writing address of said buffer memories for storing the N×P bit parallel data therein; and
- a multiplexing circuit for converting the N bit data outputted by the plurality of time switches to N bit serial data and sending said converted serial data to the output highway.

17. The time division switching apparatus of claim 16, wherein each time switch comprises:
a control memory for storing control information to read and select the parallel data stored in said buffer memory; and
a selector for selecting said predetermined portion of N bit data from the N×P parallel data stored in said buffer memory based on the control information.

18. A time division switching apparatus for receiving data from an input highway, interchanging a portion of the data, and sending data to an output highway, comprising:
a demultiplexing circuit for converting N bit data received serially from the input highway to N×P bit parallel data of predetermined parallel data units, where N and P are integers;
a plurality of time switches, each including
a buffer memory for storing the N×P bit parallel data received from the demultiplexing circuit,
a counter for generating a writing address of the buffer memory for storing the N×P bit parallel data in the buffer memory,
a control memory for storing control information to read and select stored parallel data, and
a selector for selecting a predetermined portion of N bit data from the N×P parallel data stored in the buffer memory based on the control information; and
a multiplexing circuit for converting N bit data sent by said plurality of time switches to N bit serial data and sending said converted serial data to the output highway.

19. The time division switching apparatus of claim 15, 17 or 18, wherein the control information includes:
a reading address of said buffer memory for reading the N×P bit data stored therein; and
a select code to be sent to the selector for selecting said predetermined portion of N bit data from the N×P bits parallel data read from said buffer memory.

20. A time division switching apparatus for interchanging data between an input highway and an output highway, comprising:
a plurality of buffer memories for storing data received from said input highway, each of the buffer memories receiving the same data in parallel;
access means provided for each buffer memory for reading/writing data from/to the buffer memmory in either a sequential write and random read or a random write and sequential read manner; and
selector means provided for each buffer memory for selecting a pre assigned portion of the data stored therein to be transferred to said output highway and outputting the selected data.

21. The time division switching apparatus of claim 20, further comprising:
a demultiplexing circuit between the input highway and the buffer memories, for converting data serially incoming from the input highway to parallel data and providing it to the buffer memories; and
a multiplexing circuit between the selector and the output highway, for converting parallel data, outputted from the selector to serial data and sending it to the output highway.

22. The time division switching apparatus of claim 20, wherein the access means includes control information having:
address information for reading/writing from/to the buffer memory, an interchange unit code for identifying a data unit to be interchanged, and
a selection code for selecting a portion of the data read from the buffer memory; and
the selector means includes:
means for identifying the data unit to be interchanged by receiving the interchange unit code; and
means for selecting a portion of said data based on the selection code.

23. The time division switching apparatus of claim 22, wherein
data consists of a plurality of bits and is contained in a time slot form in said buffer memories;
said buffer memories each comprises a plurality of buffers to store a predetermined number of data corresponding to a predetermined number of time slots;
said access means comprises means for reading/writing the predetermined number of data corresponding to said time slots; and
said selector means comprises time slot selector means for selecting data corresponding to a time slot; and said selector means further comprises
portion select/assembly means for selecting a portion of data assigned by the selection code and assembling it into a time slot form; and
switch means for switching the output of the selector means between the output of said time slot selector means and said portion select/assembly means based on the interchange unit code.

24. A time division switching method for interchanging data between an input highway and an output highway, comprising the steps of:
providing a plurality of time switches;
assigning control information to each time switch for selecting a predetermined portion of data;
supplying the same data from said input highway to each of the time switches in parallel;
storing the supplied data in a memory contained in each time switch;
selecting the predetermined portion of data from the stored data based on said control information for each time switch; and
outputting the selected portions of data to said output highway.

25. The time division switching method of claim 24, further comprising the steps of:
converting the data from said input highway to parallel data before the supplying step; and
converting the selected portions of data to serial data after the selecting step.

* * * * *

UNITED STATES PATENT AND TRADEMARK OFFICE
CERTIFICATE OF CORRECTION

PATENT NO. : 5,123,012
DATED : June 16, 1992
INVENTOR(S) : Takamasa Suzuki et al.

It is certified that error appears in the above-identified patent and that said Letters Patent is hereby corrected as shown below:

Column 1, line 61, after "#0" delete the comma ",";

Column 2, line 3, after "#0" delete the comma ",";

Column 8, line 11, delete "becomes".

Column 11, line 41, "$t_2'$" should be --$t_2$--.

Column 14, line 50, "76" should be --7b--;
　　　　　　line 59, after "highway" insert a
　　　　　　　period --.--.

Column 15, line 19, "mexories" should be --memories--.

Signed and Sealed this

Nineteenth Day of October, 1993

Attest:

BRUCE LEHMAN

*Attesting Officer*　　*Commissioner of Patents and Trademarks*